United States Patent [19]
Seto et al.

[11] Patent Number: 5,381,522
[45] Date of Patent: Jan. 10, 1995

[54] IMAGE PROCESSING APPARATUS AND METHOD

[75] Inventors: Kaoru Seto, Chigasaki; Atsushi Kashihara, Hachioji, both of Japan

[73] Assignee: Canon Kabushiki Kaisha, Tokyo, Japan

[21] Appl. No.: 855,104

[22] Filed: Mar. 20, 1992

[30] Foreign Application Priority Data

Mar. 28, 1991 [JP] Japan ................................ 3-064268

[51] Int. Cl.⁶ ............................................. G06F 15/62
[52] U.S. Cl. ...................................................... 395/143
[58] Field of Search ............... 395/143, 141, 133, 135, 395/150, 151; 340/728, 734, 747, 750; 345/127, 129, 130

[56] References Cited

U.S. PATENT DOCUMENTS 5,123,085  6/1992  Wells et al. ..................... 395/121
5,202,960  4/1993  Seiler ................................. 395/143

FOREIGN PATENT DOCUMENTS 356224  2/1990  European Pat. Off. .

Primary Examiner—Phu K. Nguyen
Attorney, Agent, or Firm—Fitzpatrick, Cella, Harper & Scinto

[57] ABSTRACT

An image processing apparatus where plural line memories store first image information corresponding to a first recording density based on input image data for plural lines, and a logical circuit included in a decision circuit determines a pixel data to be interpolated corresponding to the pixel position of second image information when the first image information is converted to the second image information in accordance with the stored first image information for plural lines. A logical circuit also included in the decision circuit detects an predetermined pattern in accordance with the stored image information for plural lines when the pixel data to be interpolated is determined, calculates a logical expressions for predetermined pattern diffusing processing, and determines a value of the pixel to be interpolated to diffuse the predetermined pattern in the second image information. With the above structure image information for a lower recording density is converted to information for a higher recording density, where half-tone images in high quality can be obtained.

15 Claims, 40 Drawing Sheets (FATTENING TYPE GRAY SCALE PATTERN)

OBJECT PIXEL

⟨LOGICAL EXPRESSIONS 1⟩ WHEN SEL="0" HOLDS $$3D = 3D$$
$$+ 4C * 2E * 3E * \overline{2C}$$
$$+ 2C * 3E * 4E * \overline{4C}$$
$$+ 4E * 2C * 3C * \overline{2E}$$
$$+ 2E * 3C * 4C * \overline{4E}$$

⟨LOGICAL EXPRESSIONS 2⟩ WHEN SEL = "1" HOLDS $$3D = 3D * (2B+2C+2D+2E+2F+3B+3F+4B+4C+4D+4E+4F)$$

SMOOTHING
$$+ 4C * 2E * 3E * \overline{2C}$$
$$+ 2C * 3E * 4E * \overline{4C}$$
$$+ 4E * 2C * 3C * \overline{2E}$$
$$+ 2E * 3C * 4C * \overline{4E}$$

DIFFUSION OF ISOLATED BLACK DOTS
$$+ 1A*1B*(\overline{1C}*\overline{1D}*\overline{1E}*\overline{1F}*\overline{1G})*(\overline{2A}*\overline{2B}*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*\overline{4B}*\overline{4C}*\overline{4D}*\overline{4E}*\overline{4F}*\overline{4G})$$

$$+ 1F*1G*(\overline{1A}*\overline{1B}*\overline{1C}*\overline{1D}*\overline{1E})*(\overline{2A}*\overline{2B}*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*\overline{4B}*\overline{4C}*\overline{4D}*\overline{4E}*\overline{4F}*\overline{4G})$$

$$+ 4A*4B*(\overline{1A}*\overline{1B}*\overline{1C}*\overline{1D}*\overline{1E}*\overline{1F}*\overline{1G})*(\overline{2A}*\overline{2B}*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4C}*\overline{4D}*\overline{4E}*\overline{4F}*\overline{4G})$$

$$+ 4F*4G*(\overline{1A}*\overline{1B}*\overline{1C}*\overline{1D}*\overline{1E}*\overline{1F}*\overline{1G})*(\overline{2A}*\overline{2B}*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*\overline{4B}*\overline{4C}*\overline{4D}*\overline{4E})$$

FIG. 12C $$
\begin{aligned}
Q = \ &2G * 3B * 3C * 3D * 3E * 3F * \overline{2A} \\
&+ 2A * 3B * 3C * 3D * 3E * 2F * \overline{2G} \\
&+ 2F * 3C * 3D * 3E * \overline{2B} \\
&+ 2B * 3C * 3D * 3E * \overline{2F} \\
&+ 2E * 3D \\
&+ 2C * 3D \\
&+ 3A * 2B * 2C * 2D * 2E * 2F \\
&+ 3G * 2B * 2C * 2D * 2E * 2F \\
&+ 3B * 2C * 2D * 2E \\
&+ 3F * 2C * 2D * 2E \\
&+ 3C * 2D \\
&+ 3E * 2D \\
&+ 1E * 2E * 3E * 4C * \overline{1C} \\
&+ 1C * 2E * 3E * 4E * \overline{4C} \\
&+ 2E * 3C \\
&+ 2C * 3E \\
&+ 1C * 2C * 3C * 4E * \overline{1E} \\
&+ 1E * 2C * 3C * 4C * \overline{4E} \\
&+ 2D * 3D \\
&+ 2A * 2B * 2C * 2D * 2E * 2F * 2G
\end{aligned}
$$

FIG. 13B

2G * 3B * 3C * 3D * 3E * 3F * $\overline{2A}$

⟨LOGICAL EXPRESSIONS 2⟩ WHEN SEL = "1" HOLDS $$3D = 3D * (2B+2C+2D+2E+2F+3B+3F+4B+4C+4D+4E+4F)$$

SMOOTHING:
$+ 4C * 2E * 3E * \overline{2C}$
$+ 2C * 3E * 4E * \overline{4C}$
$+ 4E * 2C * 3C * \overline{2E}$
$+ 2E * 3C * 4C * \overline{4E}$ DIFFUSION OF ISOLATED BLACK DOTS:
$+ 1A * 1B * (\overline{1C} * \overline{1D} * \overline{1E} * \overline{1F} * \overline{1G}) * (\overline{2A} * \overline{2B} * \overline{2C} * \overline{2D} * \overline{2E} * \overline{2F} * \overline{2G})$
$* (\overline{3A} * \overline{3B} * \overline{3C} * \overline{3D} * \overline{3E} * \overline{3F} * \overline{3G}) * (\overline{4A} * \overline{4B} * \overline{4C} * \overline{4D} * \overline{4E} * \overline{4F} * \overline{4G})$ $+ 1F * 1G * (\overline{1A} * \overline{1B} * \overline{1C} * \overline{1D} * \overline{1E}) * (\overline{2A} * \overline{2B} * \overline{2C} * \overline{2D} * \overline{2E} * \overline{2F} * \overline{2G})$
$* (\overline{3A} * \overline{3B} * \overline{3C} * \overline{3D} * \overline{3E} * \overline{3F} * \overline{3G}) * (\overline{4A} * \overline{4B} * \overline{4C} * \overline{4D} * \overline{4E} * \overline{4F} * \overline{4G})$ $+ 4A * 4B * (\overline{1A} * \overline{1B} * \overline{1C} * \overline{1D} * \overline{1E} * \overline{1F} * \overline{1G}) * (\overline{2A} * \overline{2B} * \overline{2C} * \overline{2D} * \overline{2E} * \overline{2F} * \overline{2G})$
$* (\overline{3A} * \overline{3B} * \overline{3C} * \overline{3D} * \overline{3E} * \overline{3F} * \overline{3G}) * (\overline{4C} * \overline{4D} * \overline{4E} * \overline{4F} * \overline{4G})$ $+ 4F * 4G * (\overline{1A} * \overline{1B} * \overline{1C} * \overline{1D} * \overline{1E} * \overline{1F} * \overline{1G}) * (\overline{2A} * \overline{2B} * \overline{2C} * \overline{2D} * \overline{2E} * \overline{2F} * \overline{2G})$
$* (\overline{3A} * \overline{3B} * \overline{3C} * \overline{3D} * \overline{3E} * \overline{3F} * \overline{3G}) * (\overline{4A} * \overline{4B} * \overline{4C} * \overline{4D} * \overline{4E})$

FIG. 12C $$\begin{aligned}
Q = &\ 2G * 3B * 3C * 3D * 3E * 3F * \overline{2A} \\
    &+ 2A * 3B * 3C * 3D * 3E * 2F * \overline{2G} \\
    &+ 2F * 3C * 3D * 3E * \overline{2B} \\
    &+ 2B * 3C * 3D * 3E * \overline{2F} \\
    &+ 2E * 3D \\
    &+ 2C * 3D \\
    &+ 3A * 2B * 2C * 2D * 2E * 2F \\
    &+ 3G * 2B * 2C * 2D * 2E * 2F \\
    &+ 3B * 2C * 2D * 2E \\
    &+ 3F * 2C * 2D * 2E \\
    &+ 3C * 2D \\
    &+ 3E * 2D \\
    &+ 1E * 2E * 3E * 4C * \overline{1C} \\
    &+ 1C * 2E * 3E * 4E * \overline{4C} \\
    &+ 2E * 3C \\
    &+ 2C * 3E \\
    &+ 1C * 2C * 3C * 4E * \overline{1E} \\
    &+ 1E * 2C * 3C * 4C * \overline{4E} \\
    &+ 2D * 3D \\
    &+ 2A * 2B * 2C * 2D * 2E * 2F * 2G
\end{aligned}$$

FIG. 13B

2F * 3C * 3D * 3E * $\overline{2B}$

2E * 3D

3C * 2E

2D*3D

4C*2E*3E*$\overline{2C}$

⟨LOGICAL EXPRESSIONS 2'⟩ WHEN SEL = "1"
(DIFFUSION OF ISOLATED WHITE DOTS) + (SMOOTHING) + (DIFFUSION OF ISOLATED BLACK DOTS)

F I G. 26

(DIFFUSION OF ISOLATED WHITE DOTS)

= 3D * [1A+1B+($\overline{1C*1D*1E*1F*1G}$)+($\overline{2A*2B*2C*2D*2E*2F*2G}$)
    +($\overline{3A*3B*3C*3D*3E*3F*3G}$)+($\overline{4A*4B*4C*4D*4E*4F*4G}$)]

* [1F+1G+($\overline{1A*1B*1C*1D*1E}$)+($\overline{2A*2B*2C*2D*2E*2F*2G}$)
    +($\overline{3A*3B*3C*3D*3E*3F*3G}$)+($\overline{4A*4B*4C*4D*4E*4F*4G}$)]

* [4A+4B+($\overline{1A*1B*1C*1D*1E*1F}$)+($\overline{2A*2B*2C*2D*2E*2F*2G}$)
    +($\overline{3A*3B*3C*3D*3E*3F*3G}$)+($\overline{4C*4D*4E*4F*4G}$)]

* [4F+4G+($\overline{1A*1B*1C*1D*1E*1F}$)+($\overline{2A*2B*2C*2D*2E*2F*2G}$)
    +($\overline{3A*3B*3C*3D*3E*3F*3G}$)+($\overline{4A*4B*4C*4D*4E}$)]

FIG. 27

$$
\begin{aligned}
\text{(SMOOTHING)} = \ & 3D * (2B + 2C + 2D + 2E + 2F + 3B + 3F + 4B + 4C + 4D + 4E + 4F) \\
& + (2B * 2C * 2D * 2E * 2F * 3B * 3F * 4B * 4C * 4D * 4E * 4F) \\
& + 4C * 2E * 3E * \overline{2C} \\
& + 2C * 3E * 4E * \overline{4C} \\
& + 4E * 2C * 3C * \overline{2E} \\
& + 2E * 3C * 4C * \overline{4E}
\end{aligned}
$$

F I G. 28

(DIFFUSION OF ISOLATED BLACK DOTS)

⟨LOGICAL EXPRESSIONS1⟩ WHEN SEL="0" HOLDS $$3D \\ + 4C * 2E * 3E * \overline{2C} \\ + 2C * 3E * 4E * \overline{4C} \\ + 4E * 2C * 3C * \overline{2E} \\ + 2E * 3C * 4C * \overline{4E}$$

⟨LOGICAL EXPRESSIONS 2⟩ WHEN SEL ="1" HOLDS $$3D * (2B+2C+2D+2E+2F+3B+3F+4B+4C+4D+4E+4F)$$

$$\left.\begin{array}{l} +\ 4C * 2E * 3E * \overline{2C} \\ +\ 2C * 3E * 4E * \overline{4C} \\ +\ 4E * 2C * 3C * \overline{2E} \\ +\ 2E * 3C * 4C * \overline{4E} \end{array}\right\} \text{SMOOTHING}$$

$$\left.\begin{array}{l} +\ \gamma 1 \\ +\ \gamma 2 \\ +\ \gamma 3 \\ +\ \gamma 4 \end{array}\right\} \begin{array}{l} \text{DIFFUSION OF} \\ \text{ISOLATED} \\ \text{BLACK DOTS} \end{array}$$

FIG. 34

$$Y_1 = \overline{\alpha} * \overline{\beta} * \{(1A*1B*(\overline{1C}*\overline{1D}*\overline{1E}*\overline{1F}*\overline{1G})*(\overline{2A}*2B*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*4B*\overline{4C}*\overline{4D}*\overline{4E}*\overline{4F}*\overline{4G})$$
$$+ 1F*1G*(\overline{1A}*\overline{1B}*\overline{1C}*\overline{1D}*\overline{1E})*(\overline{2A}*2B*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*4B*\overline{4C}*\overline{4D}*\overline{4E}*\overline{4F}*\overline{4G})$$
$$+ 4A*4B*(\overline{1A}*\overline{1B}*\overline{1C}*\overline{1D}*\overline{1E}*\overline{1F}*\overline{1G})*(\overline{2A}*2B*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4C}*\overline{4D}*\overline{4E}*\overline{4F}*\overline{4G})$$
$$+ 4F*4G*(\overline{1A}*\overline{1B}*\overline{1C}*\overline{1D}*\overline{1E}*\overline{1F}*\overline{1G})*(\overline{2A}*2B*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*4B*\overline{4C}*\overline{4D}*\overline{4E})\}$$

FIG. 35

$$Y_2 = \alpha * \overline{\beta} * [1D*1E*(\overline{1A}*1B*\overline{1C}*1F*\overline{1G})*(2\overline{A}*2B*2\overline{C}*2D*2\overline{E}*2F*\overline{2G})$$
$$*(\overline{3A}*3B*3C*\overline{3D}*3E*\overline{3F}*3G)*(\overline{4A}*4B*4C*\overline{4D}*4E*\overline{4F}*4G)$$

$$+2B*2C*(\overline{1A}*1B*\overline{1C}*1D*\overline{1E}*1F*\overline{1G})*(\overline{2A}*2D*2\overline{E}*2F*\overline{2G})$$
$$*(\overline{3A}*3B*3C*\overline{3D}*3E*\overline{3F}*3G)*(\overline{4A}*4B*4C*\overline{4D}*4E*\overline{4F}*4G)$$

$$+3F*3G*(\overline{1A}*1B*\overline{1C}*1D*\overline{1E}*1F*\overline{1G})*(\overline{2A}*2B*2C*\overline{2D}*2E*\overline{2F}*2G)$$
$$*(\overline{3A}*3B*3C*\overline{3D}*\overline{3E})*(\overline{4A}*4B*4C*\overline{4D}*4E*\overline{4F}*\overline{4G})$$

$$+4F*4G*(\overline{1A}*1B*\overline{1C}*1D*\overline{1E}*1F*\overline{1G})*(\overline{2A}*2B*2C*\overline{2D}*2E*\overline{2F}*2G)$$
$$*(\overline{3A}*3B*3C*\overline{3D}*3E*\overline{3F})*(\overline{4A}*4B*4C*\overline{4D}*\overline{4E}))]$$

FIG. 36

$$Y_3 = \overline{\alpha} * \beta * [1F*1G*(\overline{1A}*\overline{1B}*\overline{1C}*\overline{1D}*\overline{1E})*(\overline{2A}*\overline{2B}*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*\overline{4B}*\overline{4C}*\overline{4D}*\overline{4E}*\overline{4F}*\overline{4G})$$

$$2D*2E*(\overline{1A}*\overline{1B}*\overline{1C}*\overline{1D}*\overline{1E}*\overline{1F}*\overline{1G})*(\overline{2A}*\overline{2B}*\overline{2C}*\overline{2F}*\overline{2G})$$
$$*(\overline{3A}*\overline{3B}*\overline{3C}*\overline{3D}*\overline{3E}*\overline{3F}*\overline{3G})*(\overline{4A}*\overline{4B}*\overline{4C}*\overline{4D}*\overline{4E}*\overline{4F}*\overline{4G})$$

$$3A*3B*(\overline{1A}*\overline{1B}*\overline{1C}*\overline{1D}*\overline{1E}*\overline{1F}*\overline{1G})*(\overline{2A}*\overline{2B}*\overline{2C}*\overline{2D}*\overline{2E}*\overline{2F}*\overline{2G})$$
$$*(\overline{3C}*\overline{3D}*\overline{3E}*\overline{3F}*\overline{3G})*(\overline{4A}*\overline{4B}*\overline{4C}*\overline{4D}*\overline{4E}*\overline{4F}*\overline{4G})$$

$$4E*4F*(\overline{1A}*\overline{1B}*\overline{1C}*\overline{1D}*\overline{1E}*\overline{1F}*\overline{1G})*(\overline{2A}*\overline{2B}*\overline{2C}*\overline{2D}*\overline{2E}*\overline{2F}*\overline{2G})$$
$$*(\overline{3A}*\overline{3B}*\overline{3C}*\overline{3D}*\overline{3E}*\overline{3F}*\overline{3G})*(\overline{4A}*\overline{4B}*\overline{4C}*\overline{4D}*\overline{4G})]$$

FIG. 37

$$Y_4 = \alpha * \beta * [\, 1C*1D*(\overline{1A}*1B*\overline{1E}*\overline{1F}*\overline{1G})*(\overline{2A}*2B*\overline{2C}*\overline{2D}*\overline{2E}*\overline{2F}*\overline{2G})$$
$$*(\overline{3A}*\overline{3B}*3C*\overline{3D}*\overline{3E}*\overline{3F}*\overline{3G})*(\overline{4A}*4B*\overline{4C}*4D*\overline{4E}*\overline{4F}*\overline{4G})$$

$$2F*2G*(\overline{1A}*1B*\overline{1C}*\overline{1D}*\overline{1E}*\overline{1F}*\overline{1G})*(\overline{2A}*2B*\overline{2C}*2D*\overline{2E})$$
$$*(\overline{3A}*\overline{3B}*3C*\overline{3D}*\overline{3E}*\overline{3F}*\overline{3G})*(\overline{4A}*4B*\overline{4C}*4D*\overline{4E}*\overline{4F}*\overline{4G})$$

$$3E*3F*(\overline{1A}*1B*\overline{1C}*\overline{1D}*\overline{1E}*\overline{1F}*\overline{1G})*(\overline{2A}*2B*\overline{2C}*2D*\overline{2E}*\overline{2F}*\overline{2G})$$
$$*(\overline{3A}*\overline{3B}*3C*\overline{3D}*\overline{3G})*(\overline{4A}*4B*\overline{4C}*4D*\overline{4E}*\overline{4F}*\overline{4G})$$

$$4C*4D*(\overline{1A}*1B*\overline{1C}*\overline{1D}*\overline{1E}*\overline{1F}*\overline{1G})*(\overline{2A}*2B*\overline{2C}*2D*\overline{2E}*\overline{2F}*\overline{2G})$$
$$*(\overline{3A}*\overline{3B}*3C*\overline{3D}*\overline{3E}*\overline{3F}*\overline{3G})*(\overline{4A}*4B*\overline{4E}*\overline{4F}*\overline{4G})\,]$$

FIG. 38

IMAGE PROCESSING APPARATUS AND METHOD

BACKGROUND OF THE INVENTION

1. Field of the Invention

Present invention relates to an image processing apparatus and method for converting image data to be outputted to a recording device such as a laser-beam printer, and more particularly, to an image processing apparatus and method for converting the dot density of input image data when the dot density of the input image data is different from the recording dot density of a printer engine.

2. Prior Art

In recent years, a laser-beam printer is widely used as output device of a computer. Especially, a lower-density (e.g., 300 dpi) laser-beam printer is rapidly becoming popular with the merits such as compact size and low cost.

As shown in FIG. 1, a laser-beam printer for 300 dpi (dot per inch) recording density consists of a printer engine 51 and a printer controller 52. The printer controller 52, connected to the printer engine 51, receives a code data from a host computer 54, makes page information consisting of dot data in accordance with the code data and sends the dot data to the printer engine 51 in sequence. The printer engine 51 forms an electrostatic latent image on an electrostatic drum in accordance with the dot data. The latent image is transferred to a recording paper.

The host computer 54 loads an application program from a floppy disk 55 having the application program, The application program is then started, the host computer acts as, e.g., a word processor.

Since various application programs are nowadays produced, an user is able to make a lot of data and preserve them using these application programs.

On the other hand, a printer engine has been improved for the purpose of higher printing quality. Printer engines adapted to a recording density of 600 dpi or more than 600 dpi have been provided. A printer controller connected to such high-density printer engine has a data memory having a capacity corresponding to its recording density (for example, a printer connected to a printer engine for 600 dpi recording density has a memory capacity four times as large as 300 dpi).

Since most of application programs are produced corresponding to printers for lower recording density, they can not be used for printers for higher recording density.

For example, FIGS. 2 and 3 respectively show the dot pattern of letters "G" and "t" for 300 dpi recording density. If these letters are recorded in 600 dpi recording density, the size of these letters become ½ in length and in width.

By adopting one of data interpolation methods to the above case, the pattern data for 300 dpi is converted to a dot pattern for 600 dpi, where the length and width of the pattern data for 300 dpi are simply doubled and applied as a pattern data for 600 dpi structure. This method can avoids diminishing the size of letters (FIGS. 4 and 5). However, after the pattern conversion, the jagged edges of the outline portion of the letters remains the same as the jagged edges in FIGS. 2 and 3. This means it is impossible to record image data in high quality corresponding to the ability of 600 dpi printer engine.

Another one of data interpolation methods is known as a smoothing technique where the jagged edges of image data are detected and smoothed. This technique can improve the quality of the image data of characters and figures having at least two continuous dots. However, the technique can not obtain the same effect in a case of recording of picture images processed in Dither method, error diffusion method and the like.

Generally, in an image data processed in a half-tone processing method such as the Dither method and the error diffusion method, in light portions, a black dot whose size is smaller than one dot (300 dpi for 300 dpi printer engine) can not be printed, and a white dot smaller than one dot can not be printed in dark portions. Consequently, the printed image quality of the light portions and the dark portions is lower than that of the neutral density portions.

FIG. 6 shows an example of a fattening type gray scale pattern. FIG. 7 shows an example of a light portion of a half-tone image printed using the gray scale pattern, and FIG. 8, an example of a dark portion of a half-tone image printed using the same. In these examples, isolated dots are expressed as scattered specks, and even if these dots are printed in higher recording density, the size of the smallest speck is the same as the size of a dot in 300 dpi. Therefore, this method can not improve the quality of printed half-tone images.

SUMMARY OF THE INVENTION

In view of the aforementioned problems and drawbacks of the conventional methods, an object of the present invention is to provide an image processing apparatus and method capable of the high-quality recording of picture images expressed by half-tone processing method, as well as smoothed images of characters and figures, when image data for lower recording density is converted for higher recording density. More particularly, a further object of the present invention is to improve the gradation of image data by detecting a predetermined pattern scattered in a pattern data of lower recording density (e.g. 300 dpi) and diffusing them in the dot pattern of higher recording density (e.g. 600 dpi).

In order to achieve the above objects, an image processing apparatus according to the present invention comprises:

memory means for storing first image information corresponding to a first recording density for plural lines;

pixel interpolation means for, when the first image information is converted to second image information corresponding to a second recording density higher than the first recording density, in accordance with the first image information for plural lines stored by the memory means, determining a pixel data to be interpolated corresponding to the pixel position of a second image information; and predetermined pattern diffusion means for, when the pixel interpolation means determines the pixel to be interpolated, detecting an predetermined pattern in accordance with the first image information for plural lines stored by the memory means and, when the predetermined pattern is detected, determining a value of the pixel to be interpolated to diffuse the predetermined pattern data in the second image information.

According to an aspect of the present invention, first image information corresponding to a first recording density is stored for plural lines. In order to generate the second image information, a value of the pixel position of the second image information is determined in accordance with the first image information for plural lines stored by the memory means. At this time, if an predetermined pattern is detected in the first image information, the pixel interpolation is performed so that the predetermined pattern can be diffused in the second image information. Thus the present invention improves the image quality of half-tone images.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 12C shows a logical expression which determines a value of an object pixel, when SEL=1 holds in a case of the main scanning direction;

FIG. 13B shows logical expression which determines a value of an object pixel in a case of the interpolation in the sub scanning direction;

FIG. 18A is a diagram showing an example of the state where a jagged edge portion is detected in smoothing processing;

FIG. 18B shows a logical expression which determines a value of an object pixel corresponding to the interpolation in FIG. 18A;

FIGS. 26 to 29 show logical operations according to the second embodiment;

FIG. 32 is a diagram showing the relation between an object pixel and peripheral pixels in a case of interpolation in the main scanning direction;

FIGS. 33 to 38 show logical operations according to the third embodiment; and

DETAILED DESCRIPTION OF THE PREFERRED EMBODIMENTS

Preferred embodiments of the present invention will be described in detail with reference to the accompanying drawings.

[First Embodiment]

Figure 1:
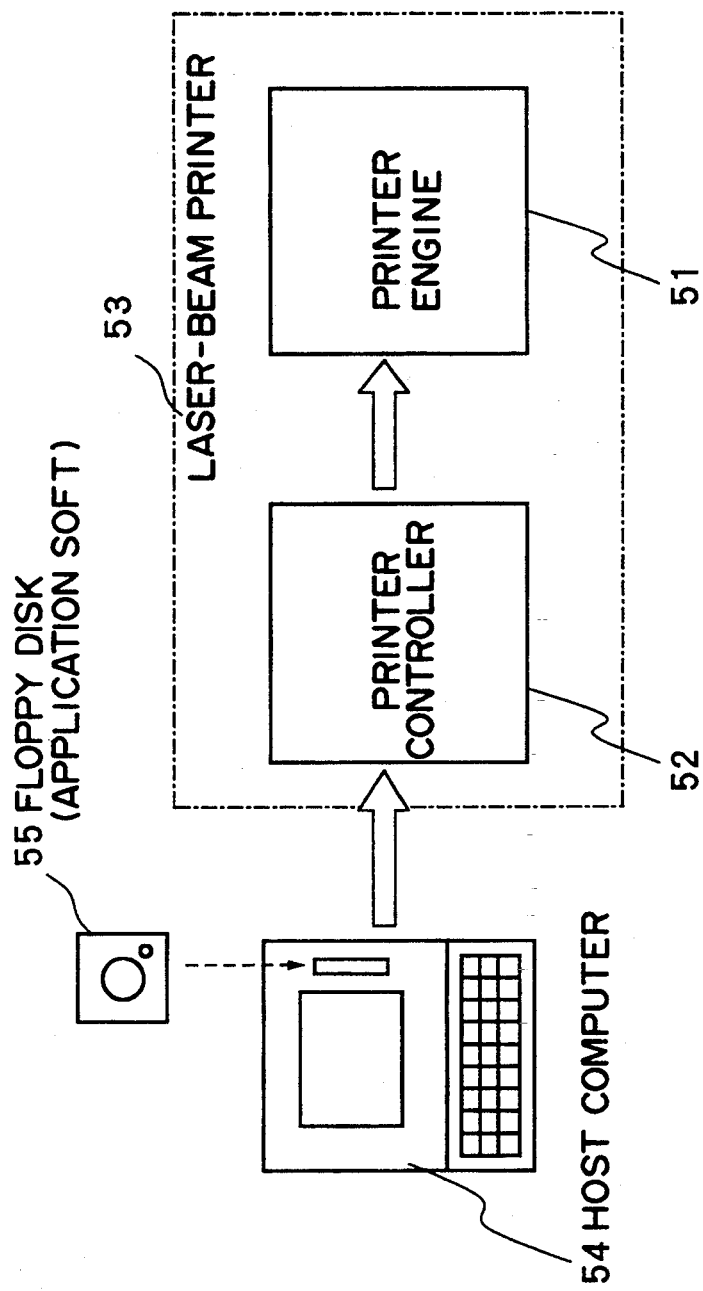
FIG. 1 is a block diagram showing a conventional image recording system.
Figure 9:
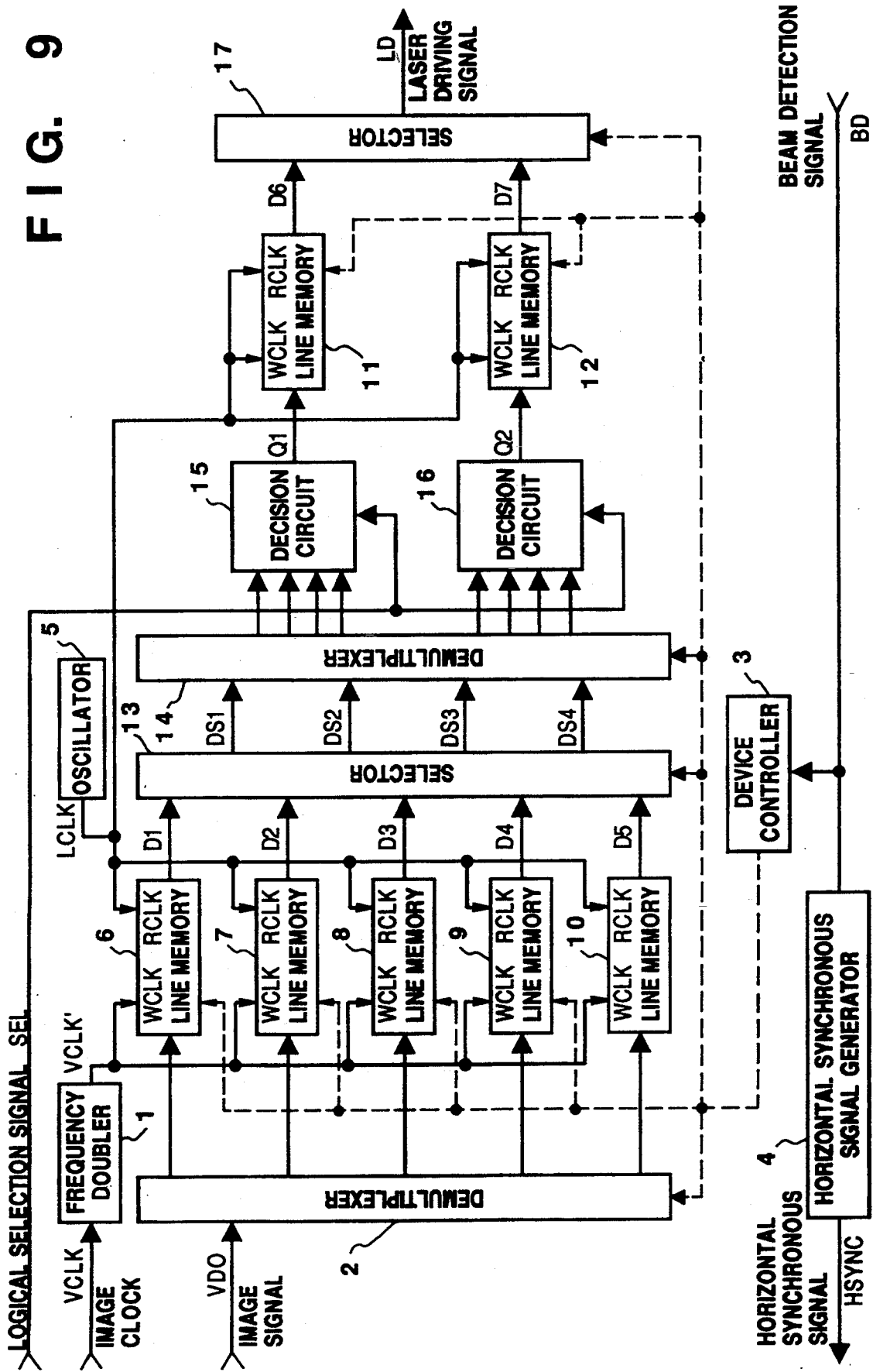
FIG. 9 is a block diagram showing the construction of a data conversion circuit in an image recording apparatus according to the first embodiment of the present invention.

In the first embodiment, described is an image recording apparatus having a data conversion circuit shown in FIG. 9 for dot conversion inserted between the printer controller 52 and the printer engine 51 (FIG. 1). Since the data conversion circuit is illustrated as a part of the printer engine 51 in this embodiment, it can be also a part of the printer controller 52. In this embodiment, the printer controller 52 sends an image signal for the recording density of 300 dpi, while the recording density of the printer engine 51 is 600 dpi. The data conversion circuit converts the resolution of the image signal so as to match the recording density of the printer engine 51. The printer engine 51 includes a laser driver which modulates a laser beam in accordance with the image signal (dot information), a scanner for scanning the beam and an electrostatic drum, as known to those skilled in the art.

The printer controller 52 sends an image signal VDO for the recording density of 300 dpi and an image clock VCLK to the data conversion circuit in response to a horizontal synchronous signal HSYNC supplied from a horizontal synchronous signal generator 4 in the data conversion circuit. The horizontal synchronous signal generator 4 sends the horizontal synchronous signal in accordance with a well-known BD (beam detection) signal output by the printer engine 51 as a synchronous signal in a main scanning direction.

The printer engine 51 receives a laser driving signal LD for recording density of 600 dpi from the data conversion circuit, the LD signal is made from the image signal VDO for recording density of 300 dpi and the image clock VCLK, and the printer engine 51 records an image in recording density of 600 dpi.

FIG. 9 is a block diagram which shows the construction of the data conversion circuit according to the first embodiment of the present invention. In FIG. 9, a frequency doubler 1 doubles the frequency of the image clock VCLK and obtains a clock VCLK' having the doubled frequency as that of VCLK. An oscillator 5 generates a clock LCLK whose frequency is quadruple of that of the image clock VCLK. A demultiplexer 2 selects one of line memories 6 to 10 and supplies the image signal VDO to the selected line memory. The horizontal synchronous signal generator 4 counts the BD signals and outputs one horizontal synchronous signal per two BD signals. A device controller 3 controls the line memories 6 to 10 per line in accordance with the BD signal. More specifically, the device controller 3 directs one of the line memories to write the image signal VDO in synchronizing with the clock VCLK', while the device controller 3 directs the other four line memories to read out the image signal synchronically with the clock LCLK. During the writing operation to one of the line memories, the reading out operation from the other four line memories is performed twice. The device controller 3 alternatively carries out the writing and reading out operations as follows. When the writing operation is performed to the line memory 6, the reading out operation is performed to the line memories 7 to 10. At the next timing, the writing operation is performed to the line memory 7 and the reading out operation is performed to the line memories 8, 9, 10 and 6.

At the next timing, the image signal VDO is written into the line memory 8, while the contents of the line memories 9, 10, 6 and 7 are read out.

Each of the line memories 6 to 10 has a capacity for image data corresponding to recording density of 600 dpi in a main scanning direction, twice as large as that for image data of 300 dpi in the main scanning direction. As the writing operation into each line memory is synchronized with the clock VCLK' having the doubled frequency of the image clock VCLK, dot information of 300 dpi is doubled in the main scanning direction and written into these line memories. The dot information of 300 dpi can be stored in the line memories as dot information of 600 dpi.

Each of signals D1 to D5 is a read out signal from each of the line memories 6 to 10 respectively. A selector 13 selects four signals of the read out signals D1 to D5 which are read from line memories under reading operation, and divides them into predetermined outputs DS1 to DS4. A four bit demultiplexer 14 alternatively outputs the output signals DS1 to DS4 from the selector 13 to a decision circuits 15 or 16 (DCT 15 or 16) at every BD signal. The decision circuits 15 and 16 compare the input image data for four lines (DS1 to DS4) and output signals Q1 or Q2 based on the comparison result. A line memory 11 stores the signal Q1 and a line memory 12 stores the signal Q2. The memory capacity of the line memories 11 and 12 is the same as that of the line memories 6 to 10. The clock LCLK is used in the writing and reading out operations of the line memories 11 and 12. A selector 17 selects an output signal D6 read out of the line memory 11 or an output signal D7 read out of the line memory 12, and outputs the selected signal as the laser driving signal LD.

The device controller 3 also controls the writing and reading out operations at the line memories 11 and 12, the selecting operation to the demultiplexers 2 and 14, and the selectors 13 and 17. The decision circuits 15 and 16 receives a logical selection signal SEL. The logical selection signal can be utilized, for example, in the structure where the host computer 54 sets the SEL signal in accordance with the type of image data to change over logics for data interpolation.

Figure 10:
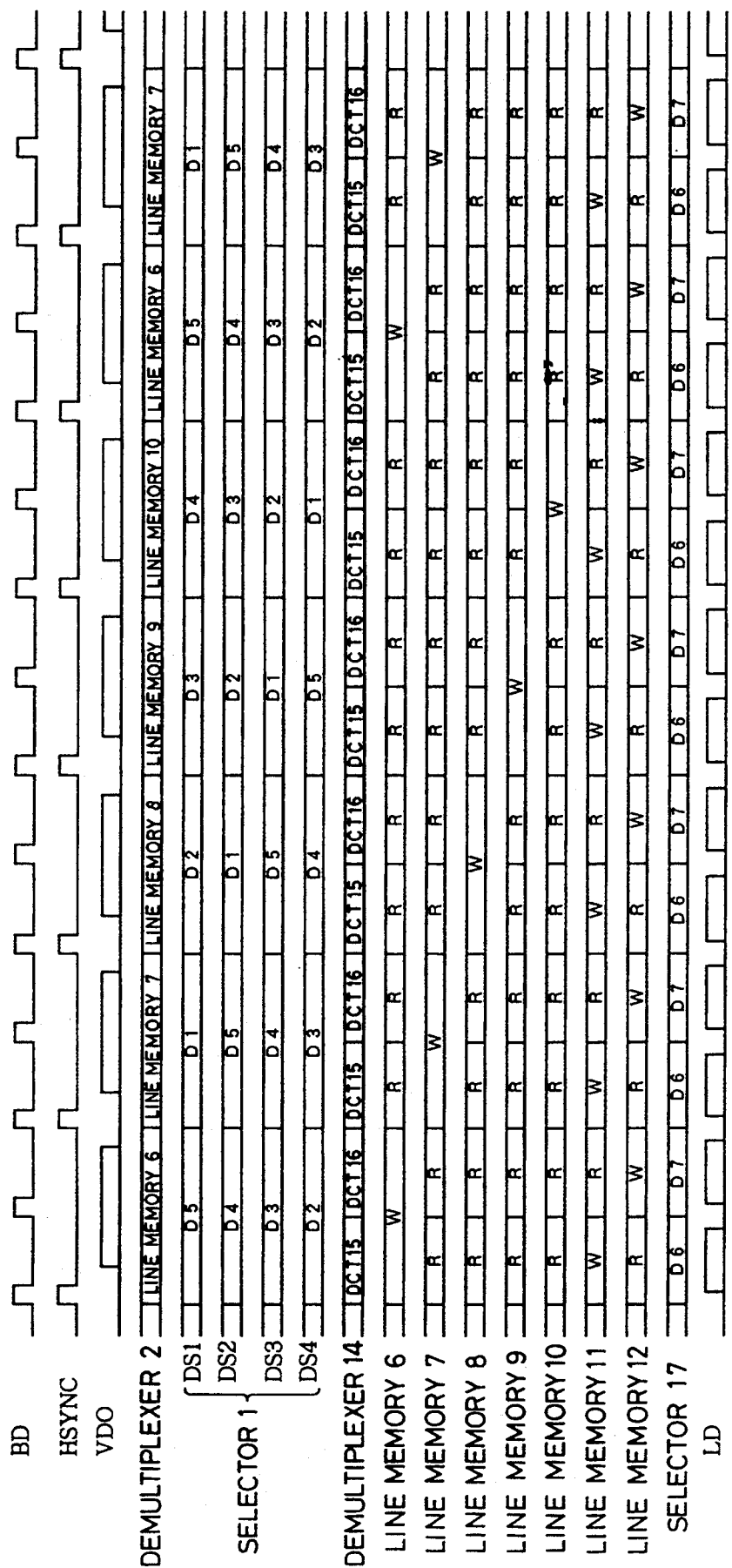
FIG. 10 is a timing chart for describing the operations of signals in the data conversion circuit shown in FIG. 9.

The operations in the structure in FIG. 9 will be described with reference to the timing chart shown in FIG. 10.

As described above, when the demultiplexer 2 selects the line memory 6, the writing operation is performed at the line memory 6. While an image signal VDO for one line is written into the line memory 6 in synchronizing with the clock VCLK', the image signals for each one line stored in the line memories 7 to 10 are read out twice, synchronically with the clock LCLK. In this case, each of the output signals DS1 to DS4 is D5, D4, D3 and D2 in turn. The first output signals DS1 to DS4 from the selector 13 are input into the decision circuit 15 via the demultiplexer 14, and the data Q1 is written into the line memory 11 after a predetermined processing. The writing and reading out operations to the line memories 11 and 12 are performed alternately. When the writing operation is carried out to the line memory 11, the reading out operation is performed at the line memory 12. The selector 17 outputs the data D7 read out of the line memory 12 as the laser driving signal LD.

On the other hand, when the second reading out operation is performed to the line memories 7 to 10, the data DS1 to DS4 are input into the decision circuit 16 via the demultiplexer 14, and after a predetermined processing, the data Q2 is written into the line memory 12. The selector 17 outputs the data D6 read out of the line memory 11 as the laser driving signal LD.

Figure 11:
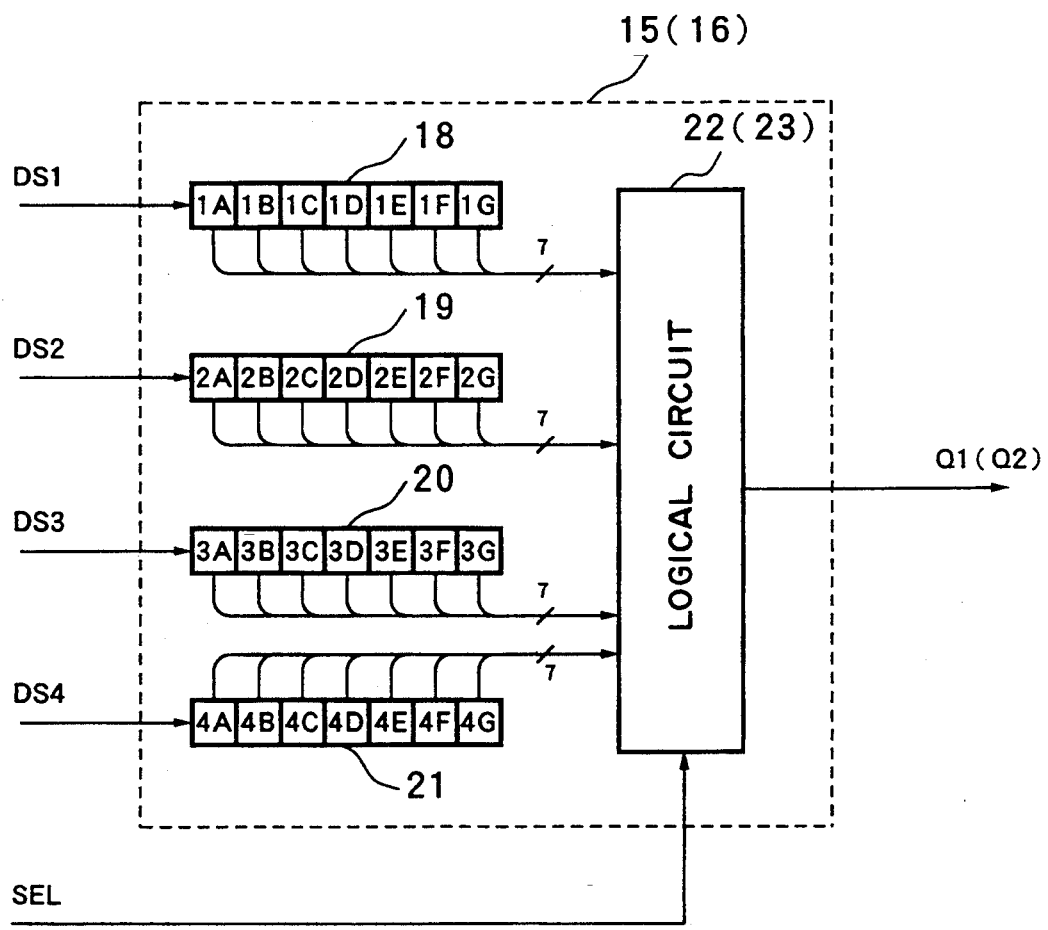
FIG. 11 is a block diagram showing the construction of a decision circuit of the first embodiment.

FIG. 11 is a block diagram showing the structure of the decision circuit 15 (16) in the first embodiment. In FIG. 11, seven bit shift registers 18 to 21 receive the input signals DS1 to DS4. A logical circuit 22 (23) receives the data output from the shift registers 18 to 21 and carries out a logical operation. More specifically, the logical circuit 22 (23) receives each output from the shift registers 18 to 21, and after a predetermined processing, outputs as the output signal Q1 (Q2). The processings at the decision circuits 15 and 16 are different and are described below.

FIGS. 12A to 12C and FIGS. 13A and 13B show the logical operations at the logical circuit 22 (23) according to the first embodiment.

Figures 12A, 12B:
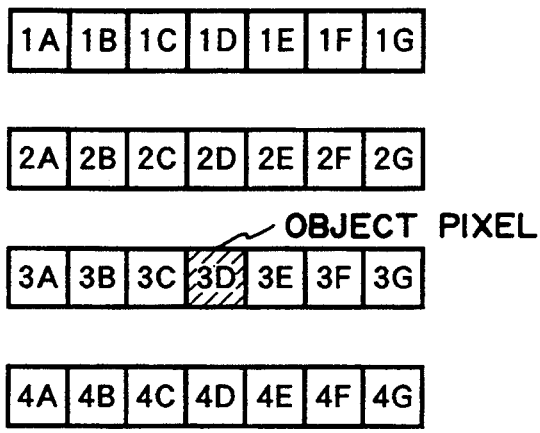
FIG. 12A is a diagram showing the relation between an object pixel and peripheral pixels in a case of interpolation in a main scanning direction.
FIG. 12B shows a logical expression which determines a value of an object pixel, when SEL (logical selection signal)=0 in the case of interpolation in the main scanning direction.

As shown in FIGS. 12B and 12C, when the SEL signal input into the logical circuit 22 (23) is "0", <logical expression 1>(FIG. 12B) is selected for the decision circuit 15, and when the SEL signal is "1", <logical expression 2>(FIG. 12C) is selected for the decision circuit 15.

In this embodiment, the logical expressions for the logical circuit 23 in the decision circuit 16 are given in FIG. 13B. The logical expression in FIG. 13B has no relation with the SEL signal.

In the decision circuit 15, when SEL=0 holds, a jagged edge portion of the image data is detected and an interpolation data to smooth the jagged edge portion is generated. The interpolation operation in the case where SEL=0 holds will be described below.

Figure 13A:
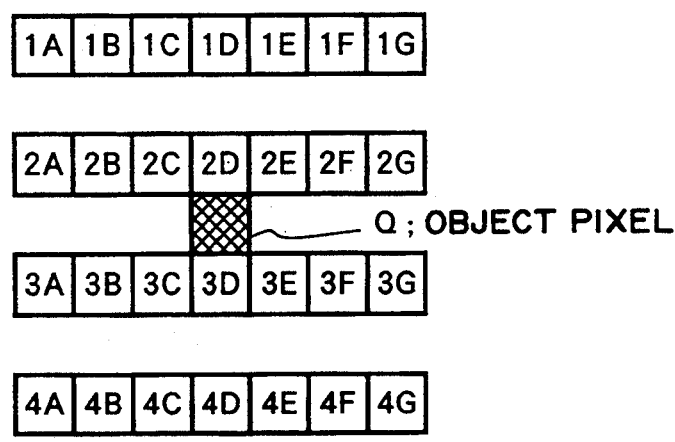
FIG. 13A is a diagram showing the relation between an object pixel and peripheral pixels in a case of interpolation in a sub scanning direction.

FIG. 12A illustrates the positional relation between an object pixel and peripheral pixels. The reference numerals of each pixel (1A, 1B, . . . 4G) correspond to those in the <logical expression 1> in FIG. 12B. FIGS. 12A and 12B are correlated as the reference pixels and the corresponding logical expression in the interpolation of the data of an object pixel. Each of the pixels has a value of "1" or "0". The pixel with a value "1" is a black pixel, and the pixel with a value "0" is a white pixel. In FIGS. 13A and 13B indicate the same correlation as in FIGS. 12A and 12B.

In the decision circuit 16, an output signal Q is set in accordance with the logical expression in FIG. 13B and an interpolation data in the sub scanning direction is generated, which means the pixel between the lines (the pixel corresponds to the position between 2D and 3D) of an image data for recording density of 300 dpi is interpolated.

In the decision circuit 15, the data of 3D is newly set in accordance with the <logical expression 1> in FIG. 12B and thus an interpolation data in the main scanning direction is generated.

The logic for the interpolation of jagged edge portions in a sideward direction will be described below.

Figures 14A, 14B:
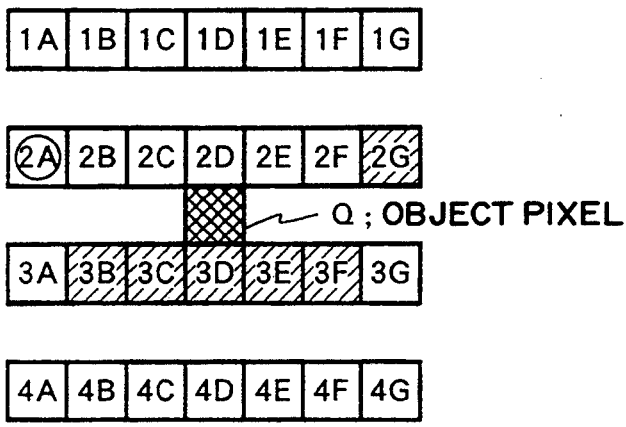
FIG. 14A is a diagram showing an example of the state where a jagged edge portion is detected in smoothing processing.
FIG. 14B shows a logical expression which determines a value of an object pixel corresponding to the interpolation in FIG. 14A.

In FIG. 14A, if 2G and 3B to 3F are recording information indicating black pixels ("1") and 2A indicates a white pixel ("0"), the image data is determined as a pattern with a jagged edge portion and an object pixel Q is decided to be black for the smoothing of the jagged edge. The logical expression corresponding to this processing is given in FIG. 14B.

Figures 15A, 15B:
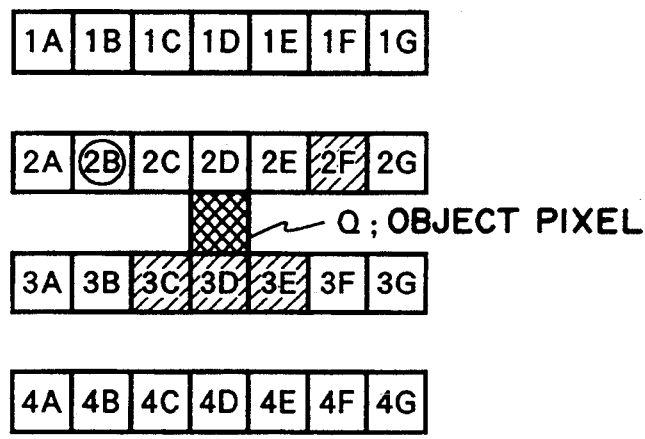
FIG. 15A is a diagram showing an example of the state where a jagged edge portion is detected in smoothing processing.
FIG. 15B shows a logical expression which determines a value of an object pixel corresponding to the interpolation in FIG. 15A.
Figures 16A, 16B:
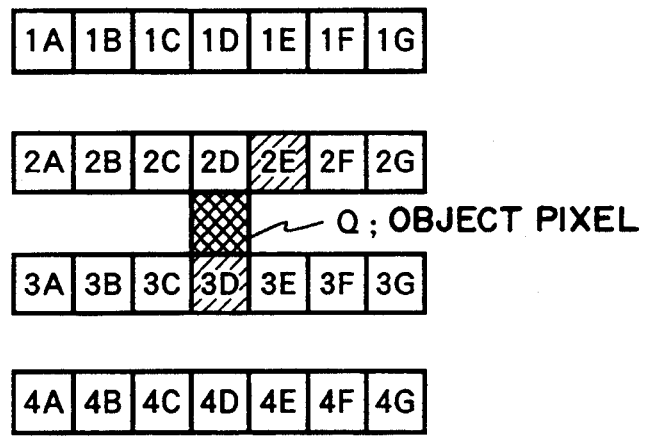
FIG. 16A is a diagram showing an example of the state where a jagged edge portion is detected in smoothing processing.
FIG. 16B shows a logical expression which determines a value of an object pixel corresponding to the interpolation in Fag. 16A.
Figure 17A:
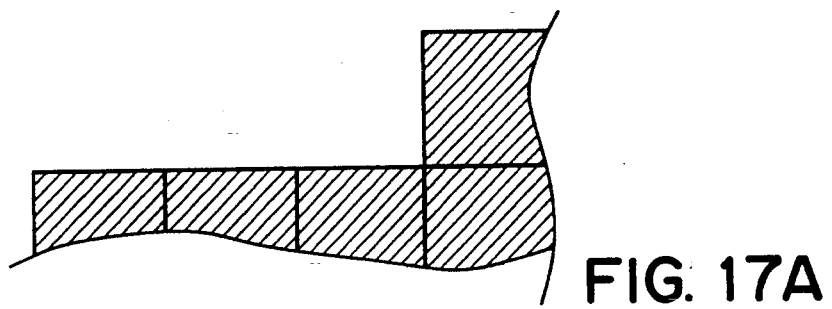
FIG. 17A and 17B are diagrams showing an example of the smoothing result.
Figure 17B:
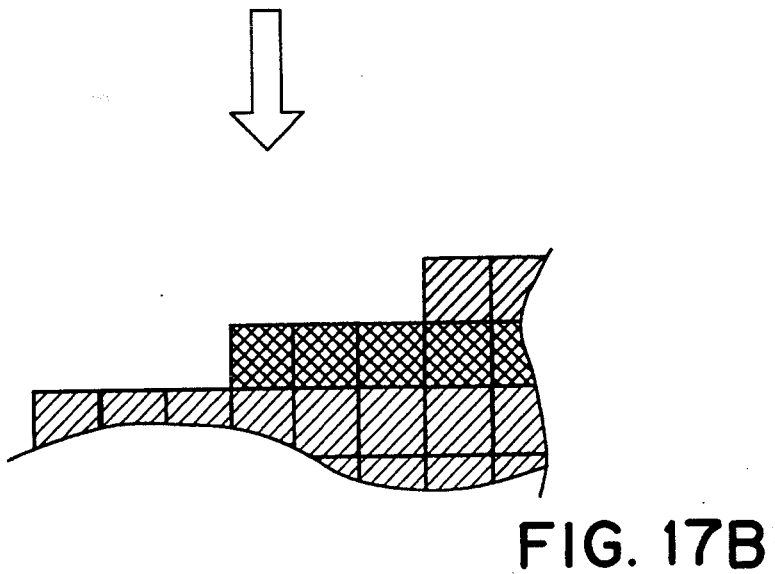

Similarly, in FIGS. 15A and 16A, a jagged edge portion is detected and the object pixel Q is determined to be black. The corresponding logical expressions are given in FIGS. 15B and 16B. The jagged edge portion in an image for recording density of 300 dpi as shown in FIG. 17A can be smoothed as shown in FIG. 17B, with the combination of the above logical expressions.

Regarding jagged edge portions symmetric along with the main scanning direction and the sub scanning direction, the logical expressions for the interpolation of the jagged edge portions in the sideward direction can be obtained by combining the similar logical expressions.

Next, the logic for the interpolation of jagged edge potions in the vertical direction (the sub scanning direction) will be described below.

Figures 19A, 19B:
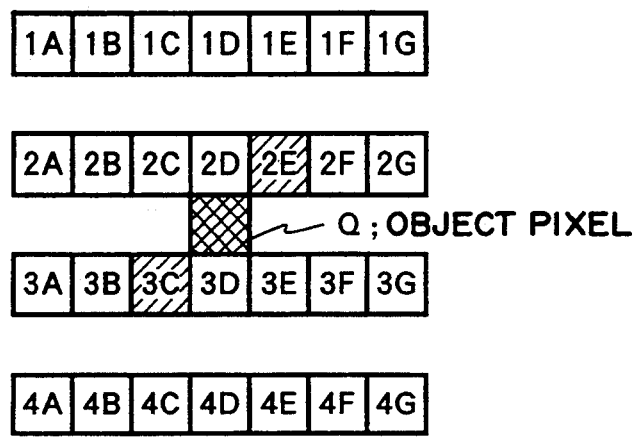
FIG. 19A is a diagram showing an example of the state where a jagged edge portion is detected in smoothing processing.
FIG. 19B shows logical expression which determines a value of an object pixel corresponding to the interpolation in FIG. 19A.
Figures 20A, 20B:
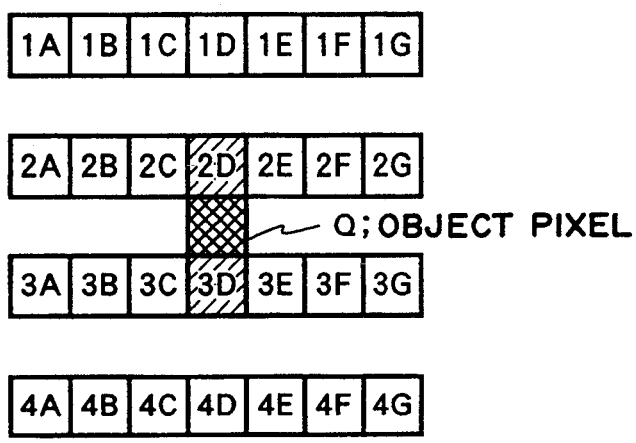
FIG. 20A is a diagram showing an example of the state where a jagged edge portion is detected in smoothing processing.
FIG. 20B shows a logical expression which determines a value of an object pixel corresponding to the interpolation in FIG. 20A.

In FIG. 18A, if 4C and 1E to 3E are recording information indicating black pixels ("1") and 1C is a white pixel ("0"), it is determined that there is a jagged edge portion in the image and the object pixel 3D is determined to be black for the interpolation of the jagged edge. The corresponding logical expression is given in FIG. 18B. In FIGS. 19A and 20A, data interpolation is carried out in the similar manner, and the corresponding logical expressions are given in FIGS. 19B and 20B. Regarding jagged edge portions symmetric along with the main scanning direction and the sub scanning direction, interpolation of the jagged edge portions in the vertical direction can be performed by combination of the similar logical expressions.

Figures 21A, 21B:
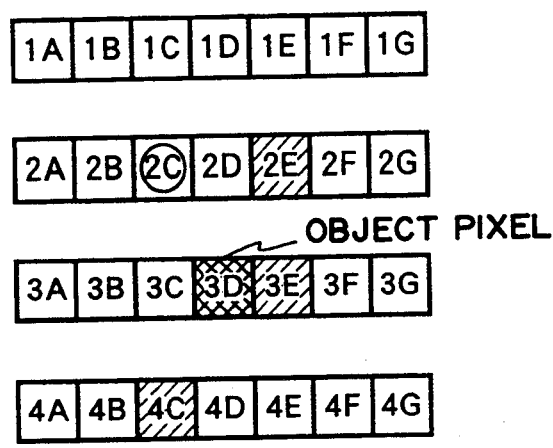
FIG. 21A is a diagram showing an example of the state where a jagged edge portion is detected in smoothing processing.
FIG. 21B shows logical expression which determines a value of an object pixel corresponding to the interpolation in FIG. 21A.

Next, the interpolation in the main scanning direction will be described. In FIG. 21A, the line including a pixel 3D is to be interpolated. When a jagged edge portion in the vertical direction is detected, the object pixel is determined to be black ("1"). As shown in FIG. 21A, if 4C, 2E and 3E are indicating black pixels "1") and 2C is a white pixel ("0"), it is determined that there is a jagged edge portion in the vertical direction, and the object pixel data 3D is determined to be black ("1"). The corresponding logical expression is given in FIG. 21B. These logics can be applied to jagged edge portions symmetric along with the main scanning direction and the sub scanning direction. Note that in case the 3D data is initially depicted to be "black", it can be kept "black".

Figures 22A, 22B:
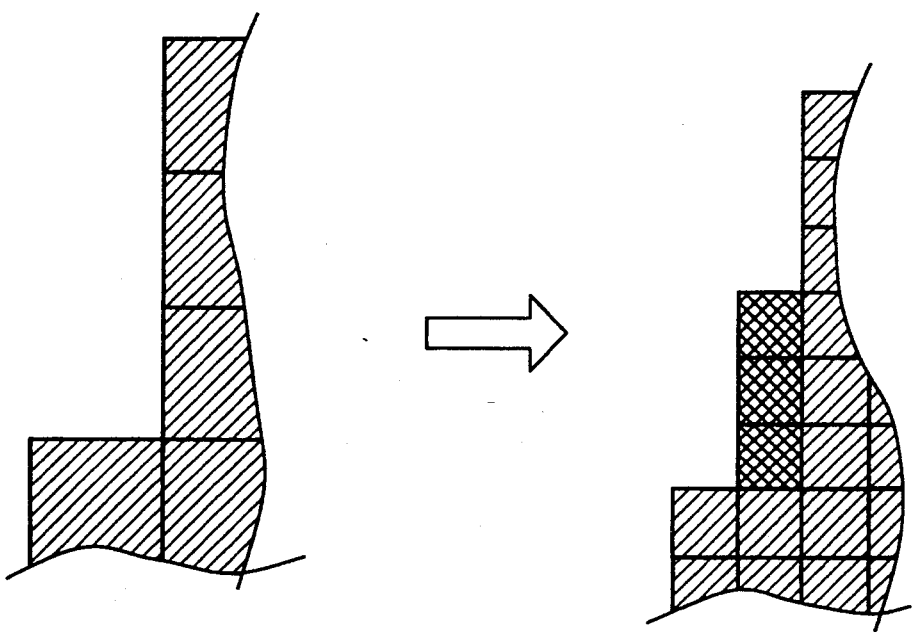
FIG. 22A and 22B are diagrams showing an example of the smoothing result.

Thus jagged edge portions of a image in the dot pattern for recording density of 300 dpi as shown in FIG. 22A can be smoothed as in FIG. 22B by the combination of the aforementioned logics.

Figure 2:
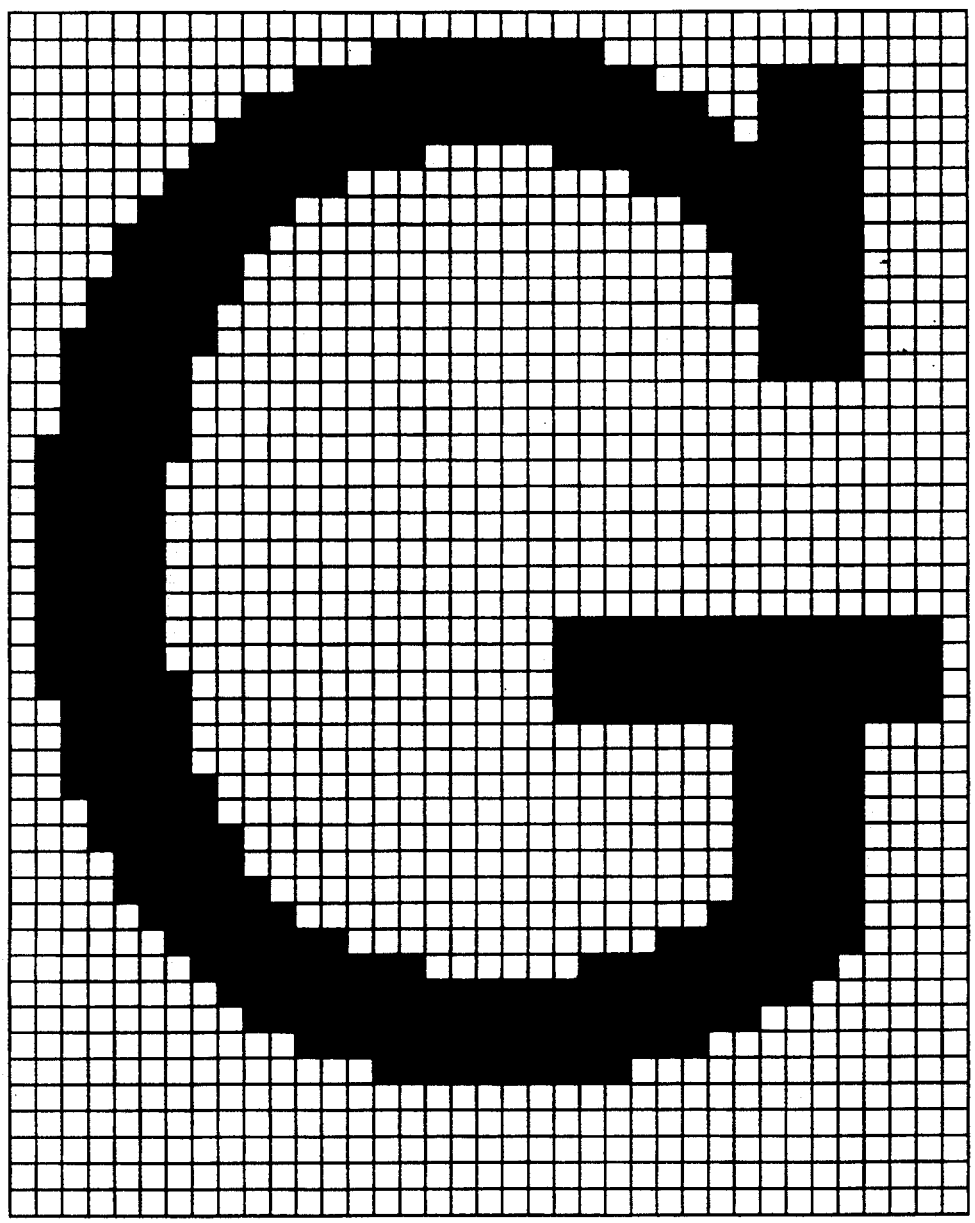
FIG. 2 is a diagram showing a conventional dot pattern of a letter "G" for recording density of 300 dpi.
Figure 3:
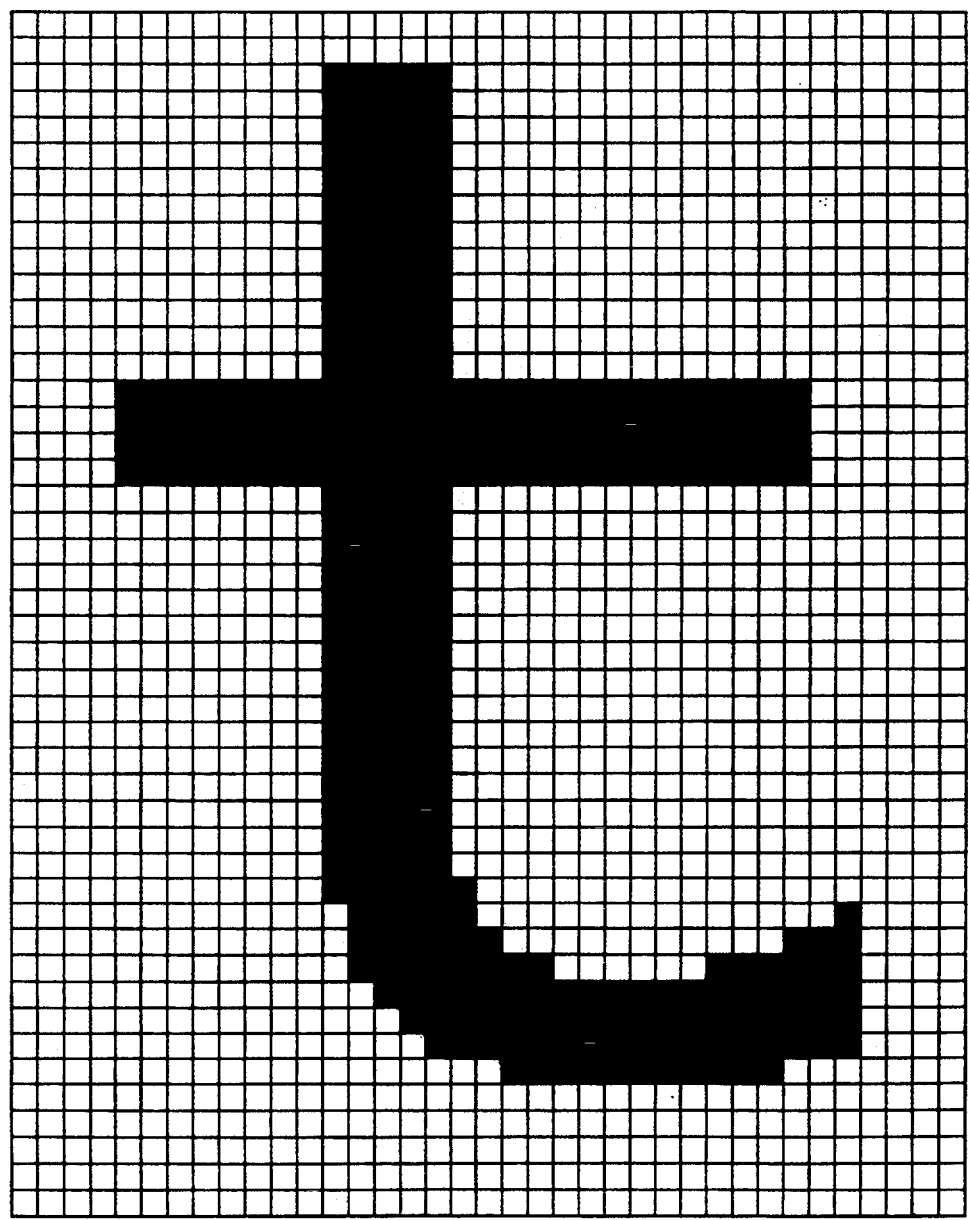
FIG. 3 is a diagram showing a conventional dot pattern of a letter "t" for recording density of 300 dpi.
Figure 4:
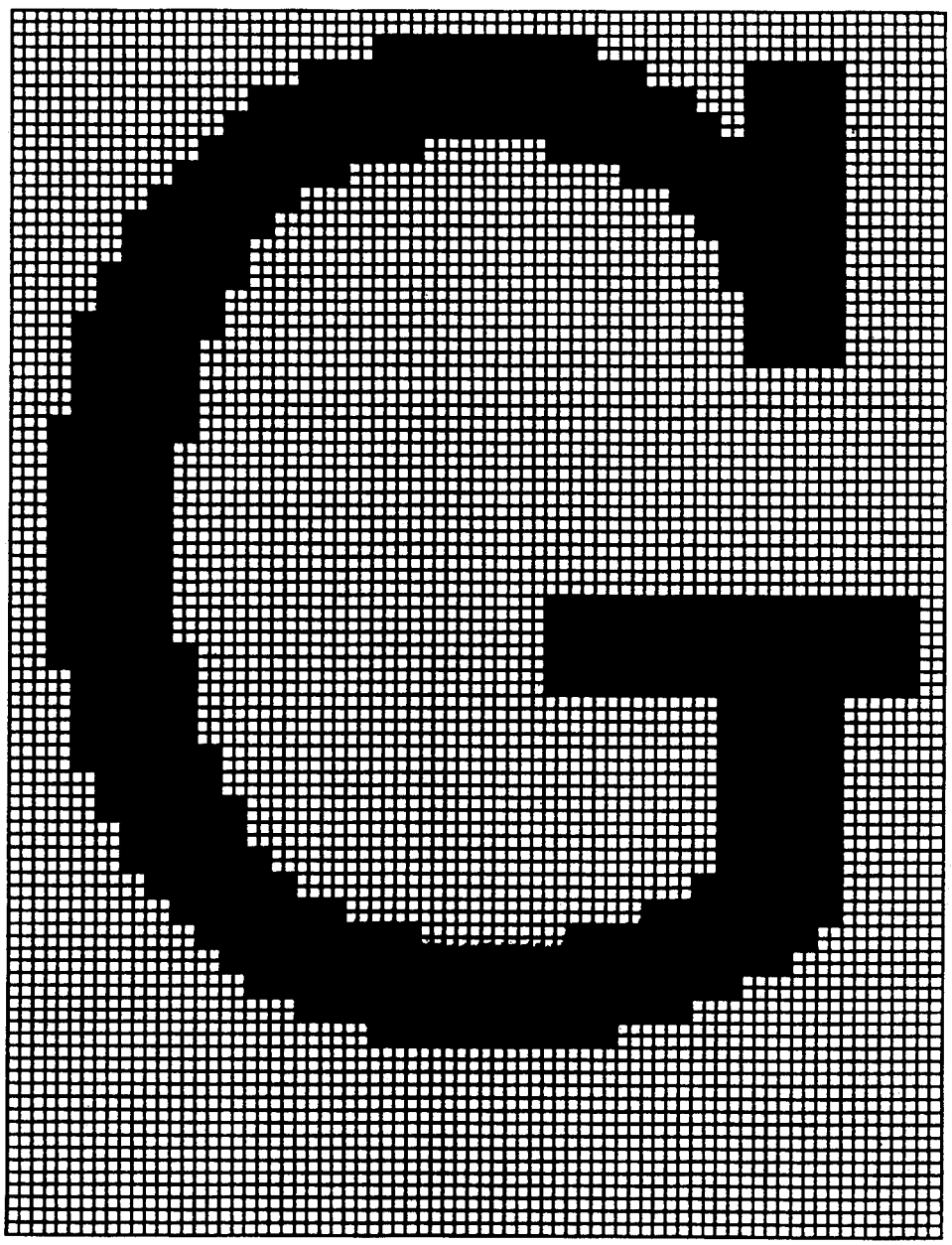
FIG. 4 is a diagram showing a dot pattern of the letter "G" in FIG. 2 for recording density of 600 dpi converted with a conventional data interpolation method.
Figure 5:
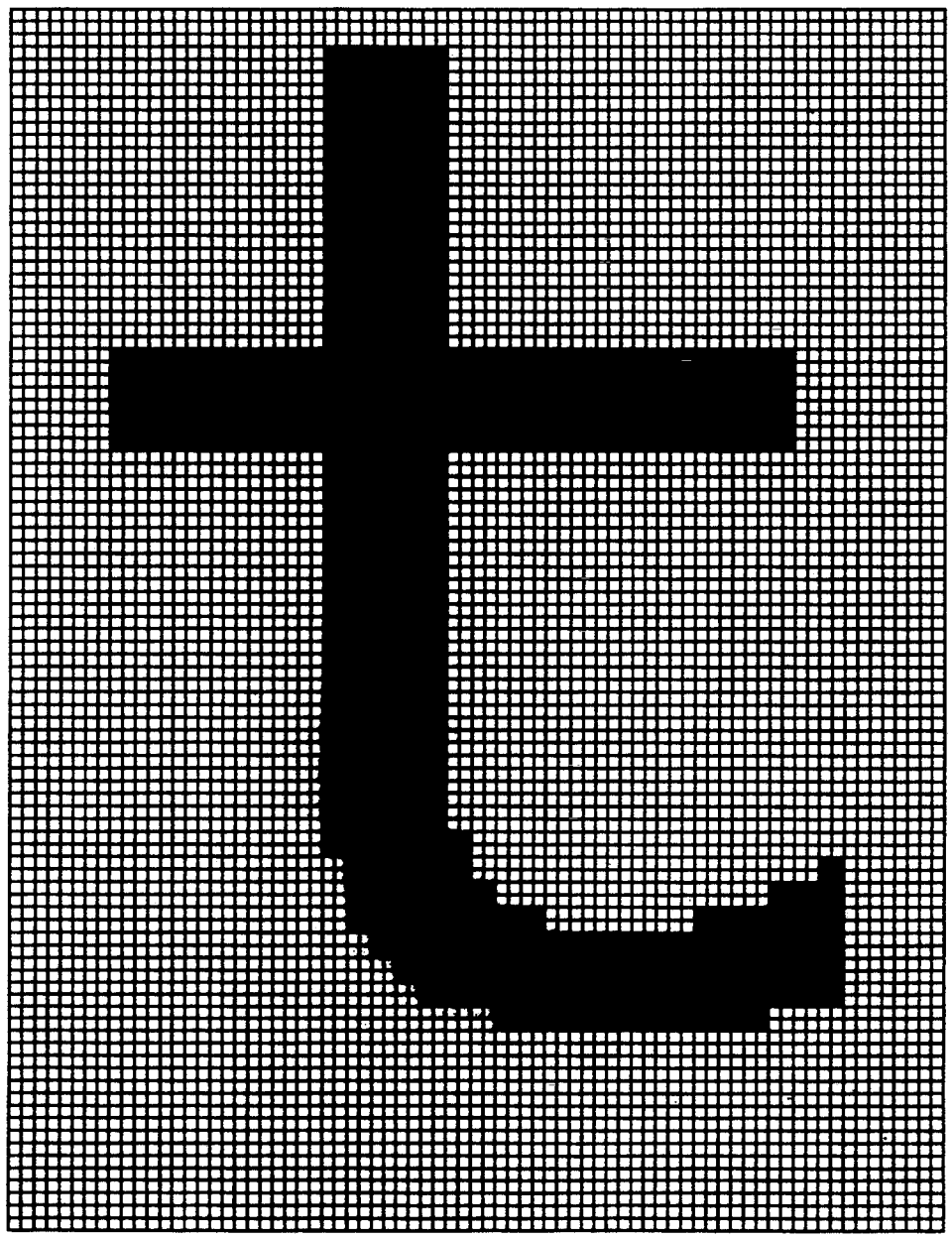
FIG. 5 is a diagram showing a dot pattern of the letter "t" in FIG. 3 for recording density of 600 dpi converted with a conventional data interpolation method.
Figure 6:
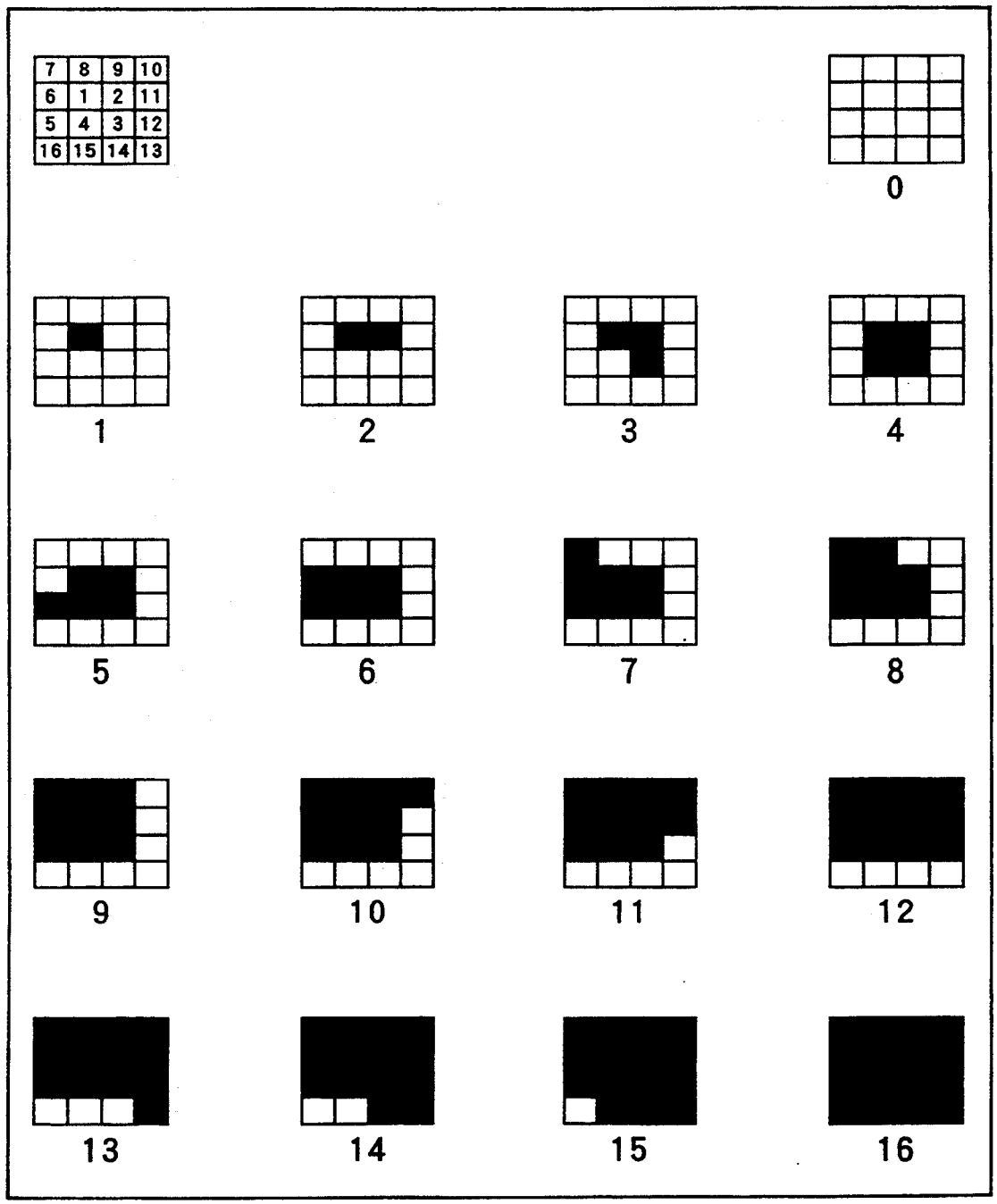
FIG. 6 is a diagram showing an example of a conventional fattening type gray scale pattern.
Figure 23:
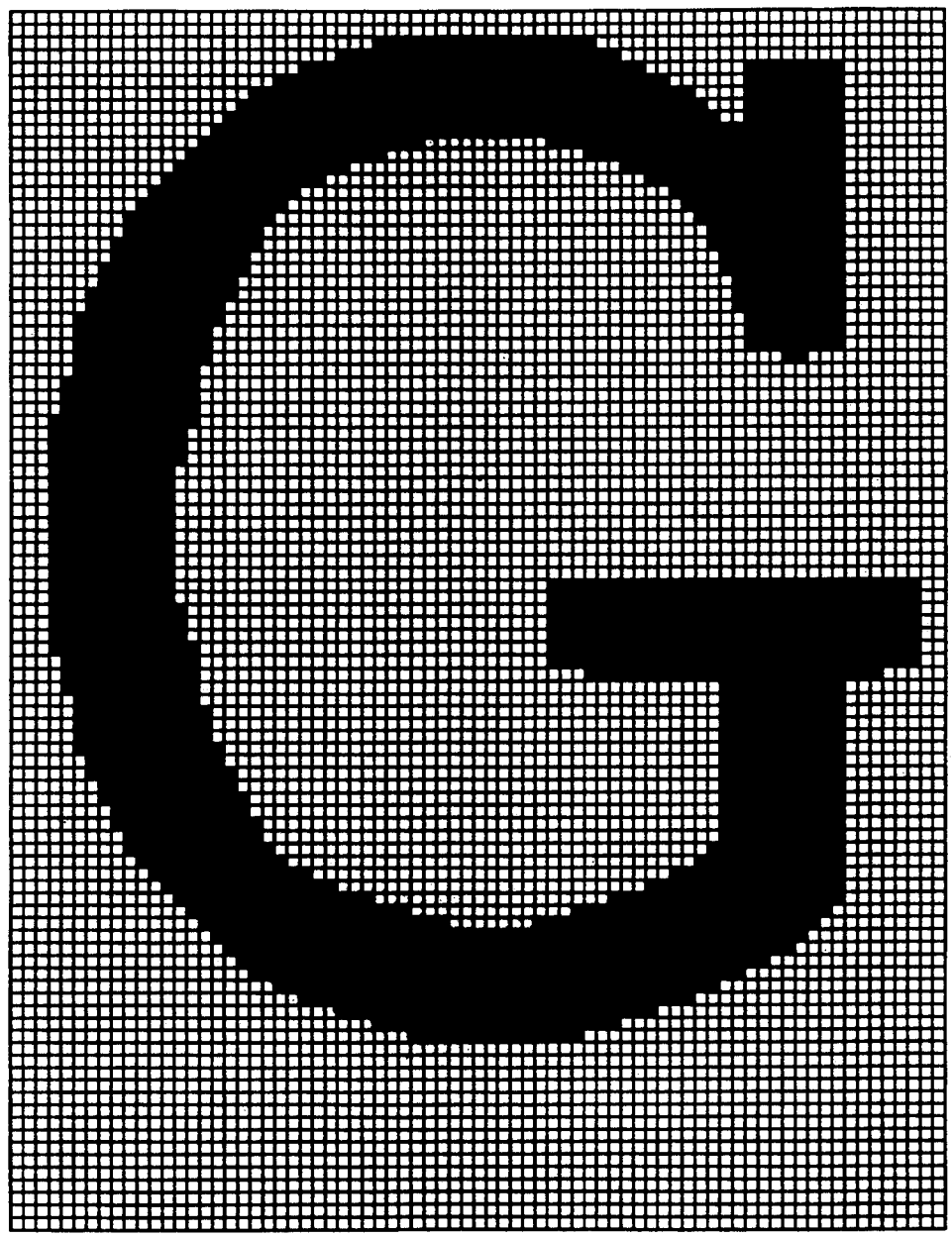
FIG. 23 is a diagram showing an example where the dot pattern for recording density o 300 dpi in FIG. 2 is interpolated and converted for recording density of 600 dpi in the present invention.
Figure 24:
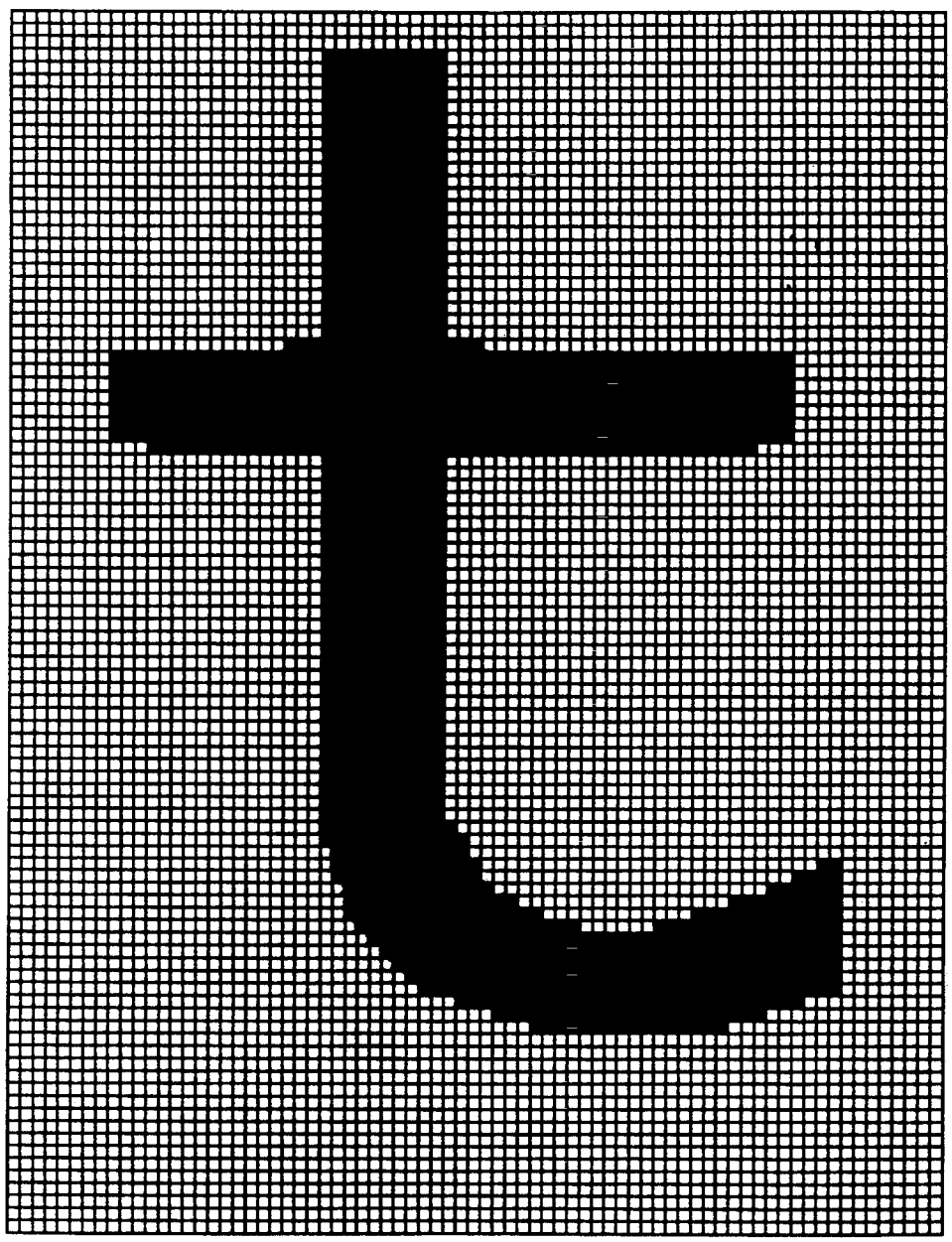
FIG. 24 is a diagram showing an example where the dot pattern for recording density of 300 dpi in FIG. 3 is interpolated for recording density of 600 dpi in the present invention.

The <logical expression 1> in FIG. 12B and the logical expression in FIG. 13B include all the above logics. As shown in FIGS. 23 and 24, the jagged edge portions of the letters "G" and "t" in FIGS. 2 and 3 can be smoothed with the interpolation based on the <logical expression 1> and the logical expression in FIG. 13B, which makes use of the characteristic advantage of the dot pattern of 600 dpi.

According to the first embodiment, interpolation dot information in the main scanning direction and the information in the sub scanning direction are generated in accordance with the information of peripheral dots of a dot to be interpolated. The recording density of the interpolation dot information is higher than that of the input image data in a fixed ratio. The printer engine having a corresponding recording density records the image in accordance with the interpolation dot information. Even when application programs for lower recording densities are used, the dot information developed for the lower recording density can be converted to the dot information for higher recording density with a small memory, thus images of high quality recorded with a higher density can be obtained.

Next, when SEL="1" holds, the logical expressions when SEL="0" holds is logically ORed with a logical expression for diffusion of isolated black dots. The ORed <logical expression 2> is given in FIG. 12C. When SEL="1" holds, the logic for smoothing can be applied to an image data having continuous dots such as a character and figure. In images processed with half-tone processing such as Dither method and error diffusion method, isolated dots are also detected and diffused in the dot pattern for higher recording density (600 dpi). In FIG. 12C, logical expressions for removing isolated dots is added to an expression when SEL="0" holds.

Figure 7:
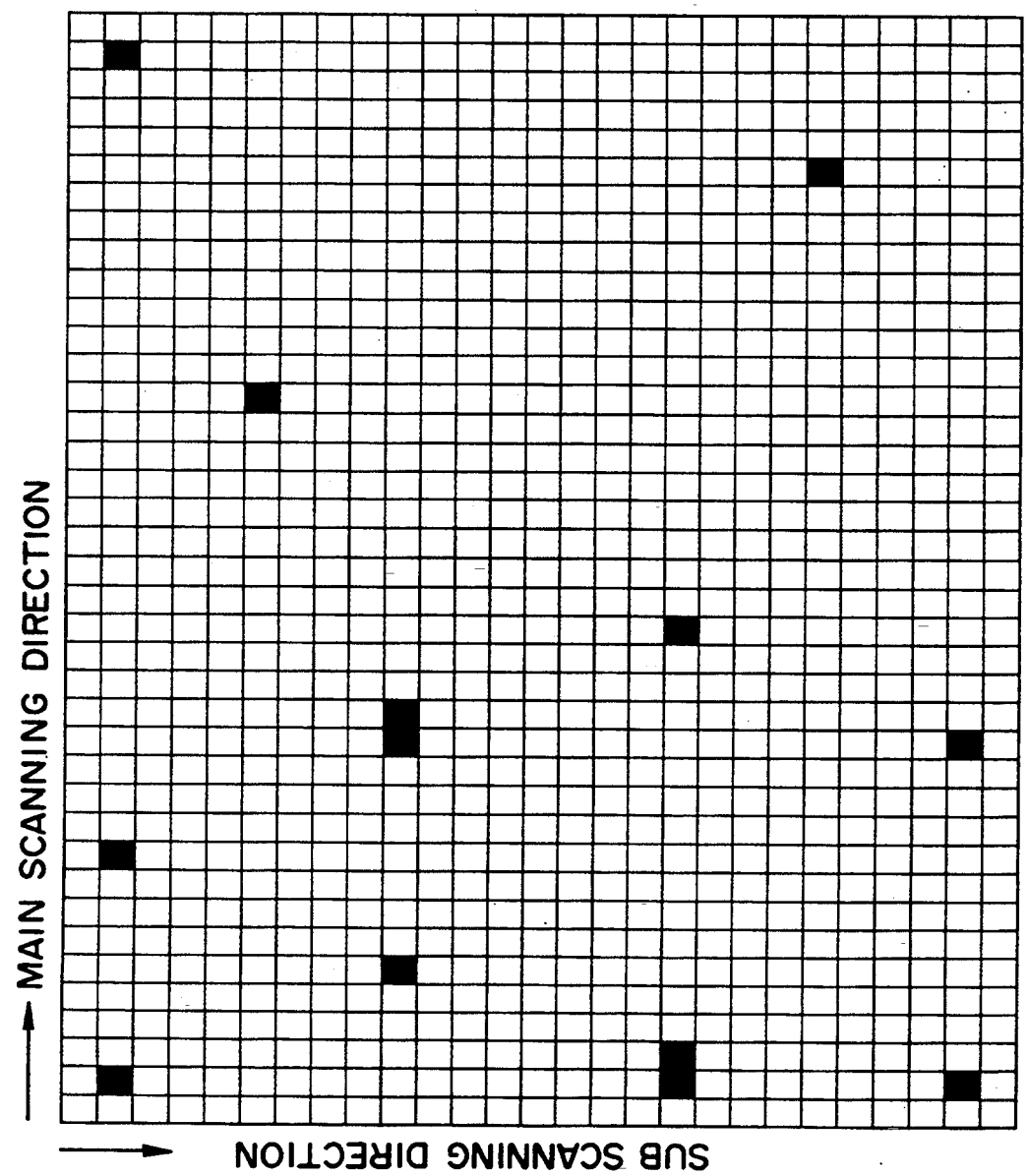
FIG. 7 is a diagram showing a printed example of a light portion of a half-tone image processed in a conventional data interpolation method using the fattening type gray scale pattern in FIG. 6.
Figure 25:
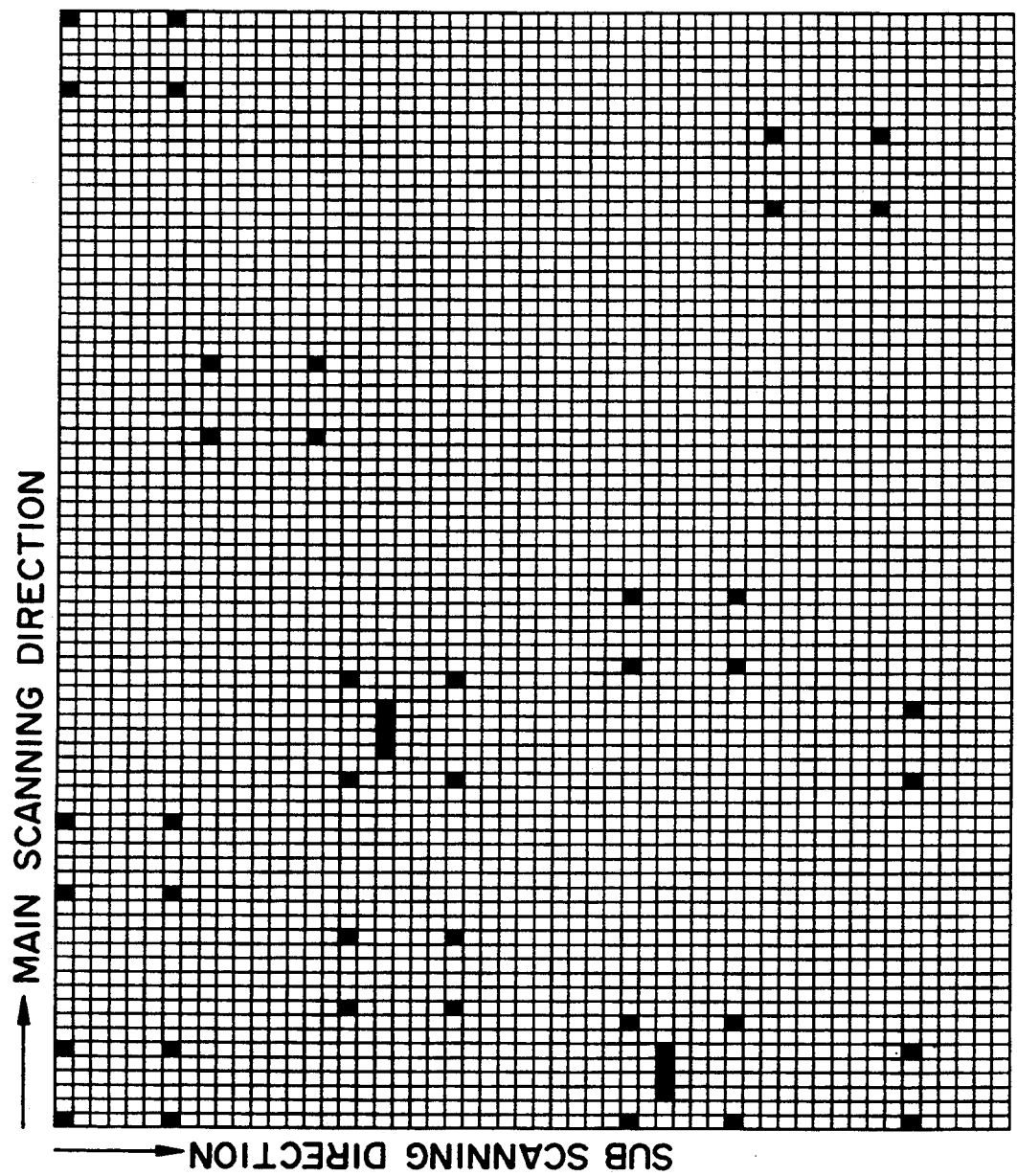
FIG. 25 is a diagram describing an arrangement of dots according to the first embodiment.

For example, when the dot pattern (shown in FIG. 7) of an image processed with the Dither method for recording density of 300 dpi is converted to the dot pattern for recording density of 600 dpi using the above logical expression. In FIG. 25, isolated dots having dot size of 300 dpi can be divided into small dots of 600 dpi and diffused. As the isolated dots in the light portions of a half-tone image are minimized and diffused, the image quality of the light portions can be improved.

In accordance with a kind of image data described below, the logical selection signal SEL may be set to change over the interpolation logics.

In case where the image data such as character or figure does not include a pixel data expressed in only one dot, the SEL signal is set to "1" so that the smoothing for graphic patterns and figures and the dot diffusion for images processed with half-tone processing such as the Dither method are carried out. In case where the image data such as character or figure includes a pixel data expressed in only one dot, only the smoothing for graphic patterns and figures is carried out and the dot diffusion for half-tone image is not carried out.

[Second embodiment]

Figure 8:
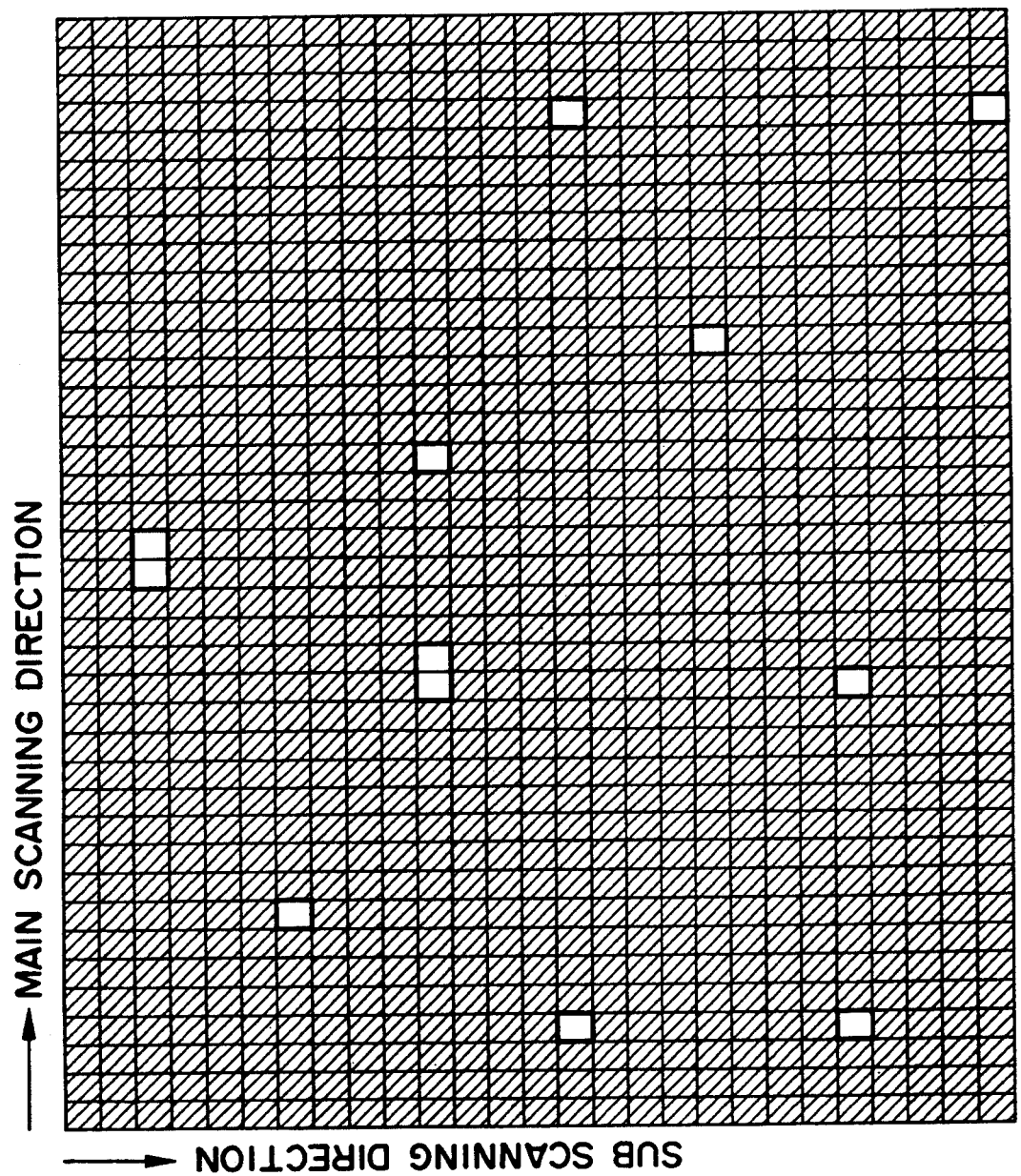
FIG. 8 is a diagram showing a printed example of a dark portion of a half-tone image processed in a conventional data interpolation method using the fattening type gray scale pattern in FIG. 6.

FIGS. 26 to 29 show logical operations according to the second embodiment. In the second embodiment, the logical expression when SEL=1 holds in the first embodiment is modified. In this case, logics for detection of isolated white dots and for diffusion of the isolated white dots are logically ORed to the logical expression of the first embodiment. Accordingly, isolated white dots (300 dpi) in a dark portion of Dither pattern as shown in FIG. 8 can be minimized and diffused in the dot pattern of 600 dpi, thus the image quality in the dark portions of half-tone image can be improved.

[Third Embodiment]

Figure 30:
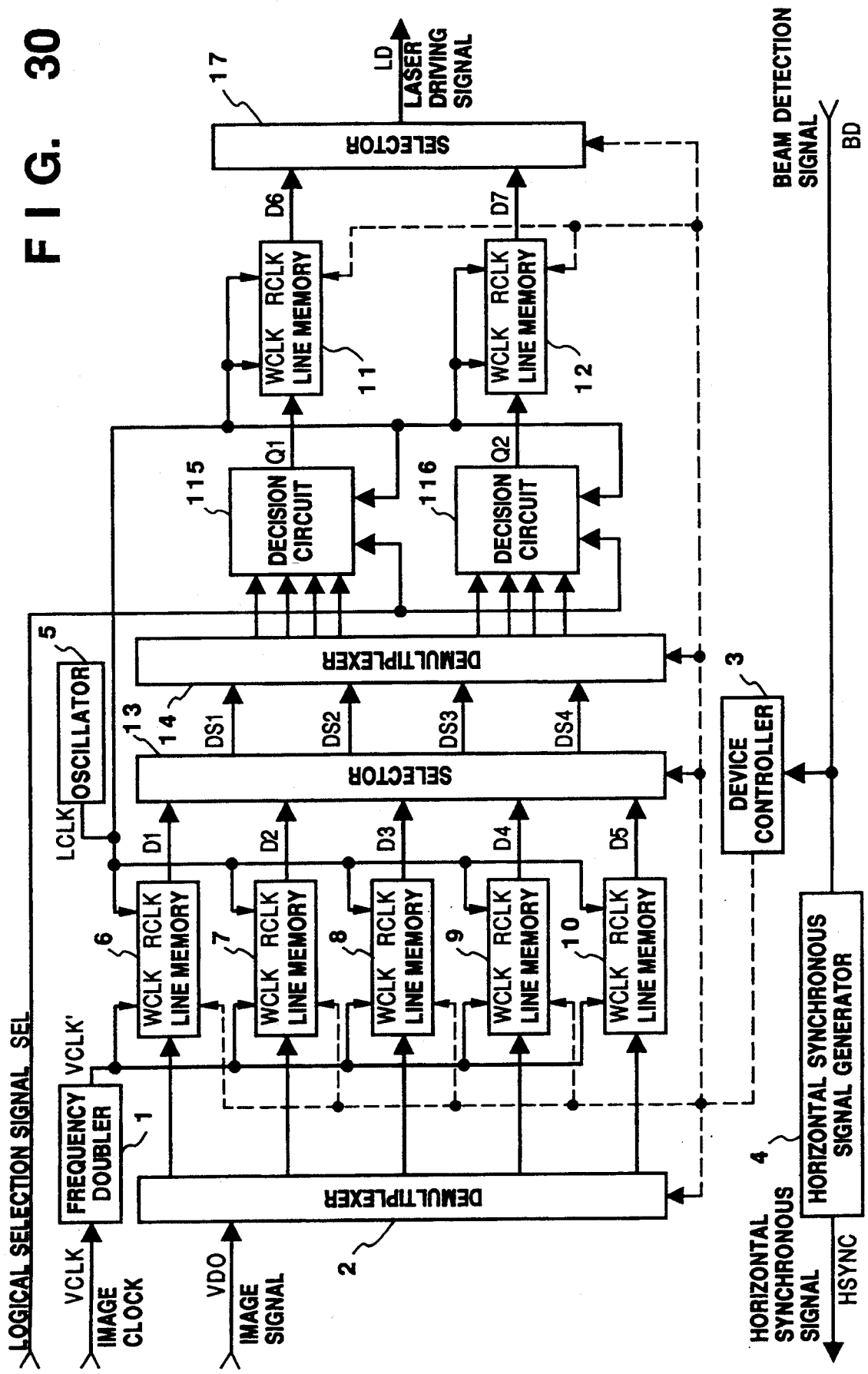
FIG. 30 is a block diagram showing the construction of an image recording apparatus according to the third embodiment of the present invention.
Figure 31:
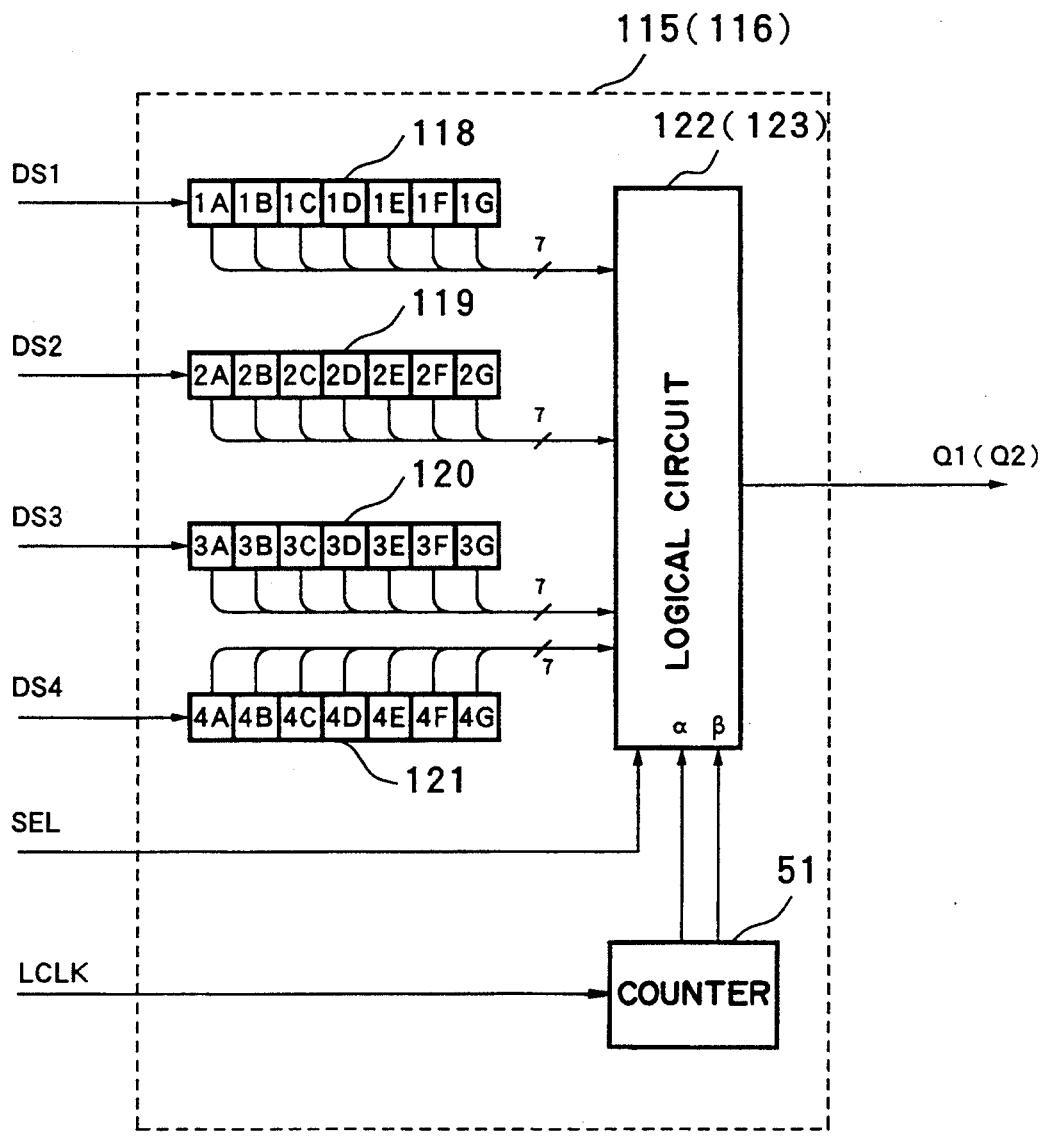
FIG. 31 is a block diagram showing in detail the construction of a decision circuit in FIG. 30.
Figures 32, 33:
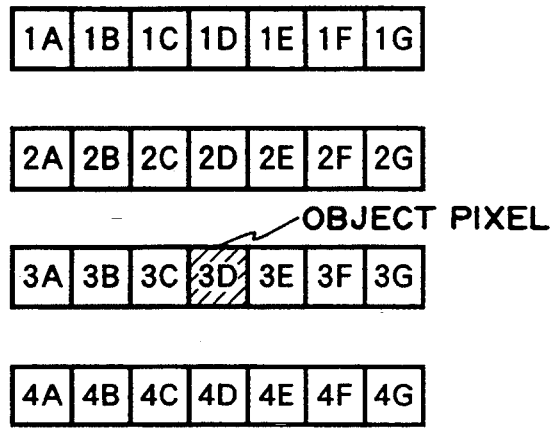

FIG. 30 is a block diagram which shows the structure of an image recording apparatus according to the third embodiment of the present invention. FIG. 31 is a block diagram which shows the structure of a decision circuit according to the third embodiment.

In FIG. 30, like reference numerals designate corresponding parts in the structure of FIG. 9, therefore explanations will be omitted. Each of decision circuits 115 and 116 according to the third embodiment has a counter 151 which receives the clock signal LCLK (FIGS. 30 and 31) and controls outputs $\alpha$, $\beta$ in order of $\alpha=0$, $\beta=0 \rightarrow \alpha=1$, $\beta=0 \rightarrow \alpha=0$, $\beta=1 \rightarrow \alpha=1$, $\beta=1$, every N-time count of the clock signal LCLK. The predetermined number N is selected, e.g., as N=8. In this case, the outputs 60, $\beta$ are changed in line with the above cycle, every eighth count of the LCLK signals. Shift registers 118 to 121 function similarly to the shift registers 18 to 21 in FIG. 11. Logical circuits 122 and 123 are based on the third embodiment.

The logical expressions for the logical circuit 122 (123) are given in FIGS. 33 to 38. FIG. 32 illustrates the relation between an object pixel and peripheral pixels, and FIGS. 33 to 38 showing corresponding logical expressions are correlated with FIG. 32, similarly to the first embodiment.

Figure 39:
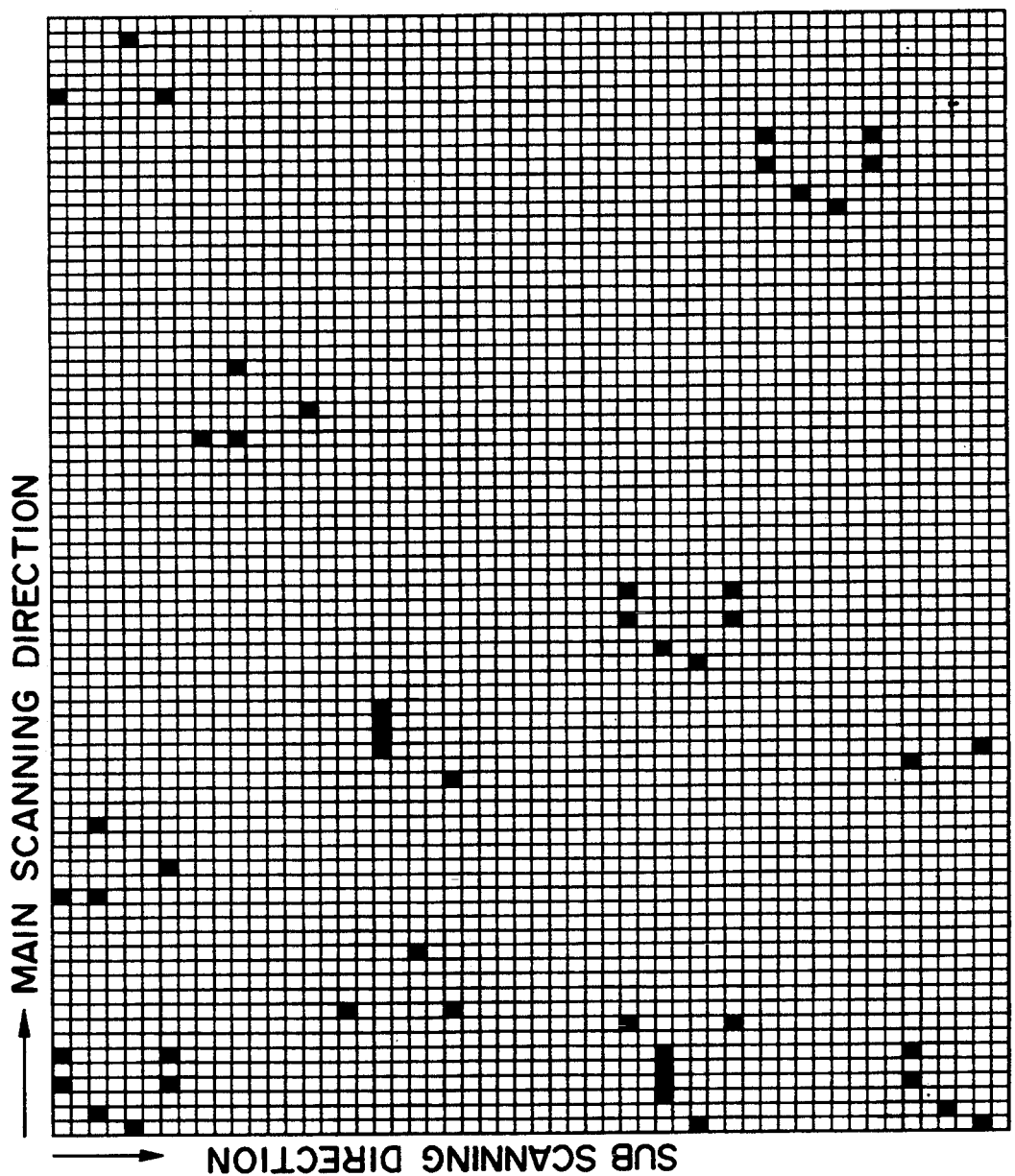
FIG. 39 is a diagram showing an arrangement of dots according to the third embodiment.

FIGS. 33 to 38 show logical expressions based on the third embodiment, and FIG. 39 illustrates the distribution of dots according to the third embodiment.

The logical expressions in the third embodiment are modifications of the logical expression in FIGS. 12B and 12C. When SEL=0 holds, the same logical expressions as <logical expression 1> are selected (FIG. 33), and when SEL=1 holds, <logical expressions 2> are selected (FIGS. 34 to 38).

When SEL=1 holds, the logical circuit 122 (123) ORs a smoothed data such as a text image and figure with a data where isolated black dots are diffused. At the diffusion of isolated black dots, as values of outputs $\alpha$, $\beta$ are changed, e.g., every the eighth clock signal LCLK count, the logical expressions for the diffusion are changed as $\gamma 1 \rightarrow \gamma 2 \rightarrow \gamma 3 \rightarrow \gamma 4 \rightarrow$ in accordance with the values of $\alpha$, $\beta$. The corresponding logical expressions are given in FIGS. 35 to 38.

According to the third embodiment, the regular distribution of the diffused dots in the first embodiment (FIG. 25) can be more irregular and inconspicuous (FIG. 39), which further improves the image quality. In addition, the diffusion of isolated white dots in the second embodiment can be improved in the third embodiment.

The counter 51 may be reset with the BD signal indicating the start of main scanning.

Further, an image recording apparatus for the present invention is not limited to a laser-beam printer which is employed in the above embodiments.

Each of isolated dots detected in the present invention is not limited to a dot size of 300 dpi and a couple of dots of 300 dpi may be detected as an isolated dot.

As described above, the present invention enables recording where data of graphic characters and figures are expressed smoothly, and enables improvement of image quality in images processed by half-tone processings such as Dither method.

The present invention may be applied to a system constituted by a plurality of apparatus or to a single apparatus. Further, it goes without saying that the invention is applicable also to a case where a program for implementing the invention is supplied to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   memory means for storing plural lines of first image information corresponding to a first recording density;

pixel interpolation means for, when said first image information is converted to second image information corresponding to a second recording density higher than said first recording density, in accordance with said first image information for plural lines stored by said memory means, determining a pixel data to be interpolated corresponding to the pixel position of said second image information; and predetermined pattern diffusion means for, when said pixel interpolation means determines said pixel data to be interpolated, detecting predetermined pattern data in accordance with said first image information for plural lines stored by said memory means and, when said predetermined pattern is detected, for determining a value of said pixel data to be interpolated so that the predetermined pattern data is diffused in said second image information.

2. The apparatus according to claim 1, further comprising smoothing means for, when said pixel interpolation means determines said pixel data to be interpolated, detecting a jagged edge portion in accordance with said first image information for plural lines stored by said memory means and, when said pixel data to be interpolated is determined, for determining a value of said pixel data to be interpolated to smooth said jagged edge portion.

3. The apparatus according to claim 2, wherein said pixel interpolation means determines a pixel data to be interpolated corresponding to the pixel position of said second image information by carrying out predetermined logical operations to said first image information for plural lines stored by said memory means, and wherein a logical operation in a main scanning direction is different from a logical operation in a sub scanning direction.

4. The apparatus according to claim 2, wherein said memory means includes plural line memories for storing image information, the number of plural line memories being more than said pixel interpolation means needs to execute interpolation, and while image information are simultaneously read out from several of said plural line memories, the next image data is written in a line memory of the rest of said plural line memories.

5. The apparatus according to claim 2, wherein said predetermined pattern diffusion means detects said predetermined pattern data by carrying out a predetermined logical operation to said first image information for plural lines stored by said memory means, and when said predetermined pattern data is detected, determines a value of said pixel data to be interpolated so as to diffuse said predetermined pattern.

6. The apparatus according to claim 5, wherein said predetermined pattern diffusion means determines logical expressions in a predetermined order and carries out said predetermined logical operation in accordance with a selected one of the logical expressions.

7. The apparatus according to claim 6, further comprising count means for counting the number of pixels interpolated by said pixel interpolation means, wherein when a count of said count means reaches a predetermined value, said predetermined pattern diffusion means changes over one logical expression to another logical expression.

8. The apparatus according to claim 2 further comprising selection means for selecting either a first mode to carry out both said predetermined pattern diffusion means and said smoothing means or a second mode to carry out only said smoothing means.

9. The apparatus according to claim 1, further comprising expanding/compressing means for expanding or compressing said first image information in a main scanning direction corresponding to said second recording density,
wherein said memory means stores the image information expanded or compressed by said expanding/compressing means, for plural lines.

10. An image processing apparatus inserted between a printer controller and a printer engine, comprising:
memory means for storing plural lines of first image information corresponding to a first recording density input by said printer controller;
pixel interpolation means for, when said first image information is converted to second image information corresponding to a second recording density higher than said first recording density, in accordance with said first image information for plural lines stored by said memory means, determining a pixel data to be interpolated corresponding to the pixel positions of said second image information; and
predetermined pattern diffusion means for, when said pixel interpolation means determines said pixel data to be interpolated, detecting predetermined pattern data in accordance with said first image information for plural lines stored by said memory means and, when said predetermined pattern data is detected, for determining a value of said pixel data to be interpolated so that the predetermined pattern data is diffused in said second image information,
wherein said second image information generated by said pixel interpolation means and by said predetermined pattern diffusion mean is output to said printer engine.

11. An image processing method comprising the steps of:
storing step for storing plural lines of first image information corresponding to a first recording density;
pixel interpolating step for, when said first image information is converted to second image information corresponding to a second recording density higher than said first recording density, in accordance with plural lines of said first image information stored in said storing step, determining a pixel data to be interpolated corresponding to the pixel position of said second image information; and
predetermined pattern diffusing step for, when pixel data to be interpolated is determined in said pixel interpolating step, detecting predetermined pattern data in accordance with said first image information for plural lines stored in said storing step and, when said predetermined pattern data is detected, for determining a value of said pixel data to be interpolated so that the predetermined pattern data can be diffused in said second image information.

12. The method according to claim 11, further comprising smoothing step for, when said pixel data to be interpolated is determined, detecting a jagged edge portion in accordance with plural lines of said first image information stored in said storing step and, when said jagged edge portion is detected, for determining a value of said pixel data to be interpolated so that said jagged edge portion can be smoothed.

13. An image processing method for performing data conversion between a printer controller and a printer engine, comprising the steps of:

storing step of storing plural lines of first image information corresponding to a first recording density input by said printer controller for plural lines;

pixel interpolating step for, when said first image information is converted to second image information corresponding to a second recording density higher than said first recording density, in accordance with plural lines of said first image information stored in said storing step, determining a pixel data to be interpolated corresponding to the pixel position of said second information; and predetermined pattern diffusing step for, when said pixel data to be interpolated is determined, detecting predetermined pattern data in accordance with plural lines of said first image information stored in said storing step and, when said predetermined pattern data is detected, for determining a value of said pixel data to be interpolated so that the predetermined pattern data is diffused in said second image information;

wherein said second image information generated in the pixel interpolating step and in the predetermined pattern diffusing step is output to said printer engine.

14. An image processing apparatus comprising:

input means for inputting first image information corresponding to a first recording density;

pixel interpolation means for, when said first image information is converted to second image information corresponding to a second recording density higher than said first recording density, in accordance with said first image information inputted by said input means, determining a pixel data to be interpolated corresponding to the pixel position of said second image information;

predetermined pattern diffusion means for, when said pixel interpolation means determines said pixel data to be interpolated, detecting predetermined pattern data in accordance with said first image information inputted by said input means and, when said predetermined pattern is detected, for determining a value of said pixel data to be interpolated so that the predetermined pattern data is diffused in said second image information; and smoothing means for, when said pixel interpolation means determines said pixel data to be interpolated, detecting a jagged edge portion in accordance with said first image information inputted by said input means and, when said pixel data to be interpolated is determined, for determining a value of said pixel data to be interpolated to smooth said jagged edge portion.

15. The apparatus according to claim 14, further comprising selection means for selecting either a first mode in which both said predetermined pattern diffusion means and said smoothing means are activated or a second mode in which only said smoothing means is activated.

* * * * *